US012749171B2

(12) United States Patent
Race et al.

(10) Patent No.: US 12,749,171 B2
(45) Date of Patent: Sep. 29, 2026

(54) IMAGE ANALYSIS-BASED BUILDING INSPECTION

(71) Applicant: 3M INNOVATIVE PROPERTIES COMPANY, St. Paul, MN (US)

(72) Inventors: Caitlin M. Race, Stillwater, MN (US); Orlin B. Knudson, Vadnais Heights, MN (US); Paul A. Kendrick, North Oaks, MN (US); Patrick S. Bowden, Minneapolis, MN (US); Nathaniel D. Anderson, St. Paul, MN (US); Rudy M. Lawler, Sioux Falls, SD (US)

(73) Assignee: 3M Innovative Properties Company, St. Paul, MN (US)

( * ) Notice: Subject to any disclaimer, the term of this patent is extended or adjusted under 35 U.S.C. 154(b) by 251 days.

(21) Appl. No.: 18/554,620

(22) PCT Filed: Apr. 7, 2022

(86) PCT No.: PCT/IB2022/053292
§ 371 (c)(1),
(2) Date: Oct. 9, 2023

(87) PCT Pub. No.: WO2022/219472
PCT Pub. Date: Oct. 20, 2022

(65) Prior Publication Data

US 2024/0212123 A1 Jun. 27, 2024

Related U.S. Application Data

(60) Provisional application No. 63/201,094, filed on Apr. 12, 2021, provisional application No. 63/201,096, filed on Apr. 12, 2021.

(51) Int. Cl.
*G06T 7/00* (2017.01)

(52) U.S. Cl.
CPC .. *G06T 7/0004* (2013.01); *G06T 2207/10024* (2013.01); *G06T 2207/10032* (2013.01);
(Continued)

(58) Field of Classification Search
CPC ......... G06T 7/0004; G06T 2207/10024; G06T 2207/10032; G06T 2207/20081; G06T 2207/20084; G06T 2207/30108
See application file for complete search history.

(56) References Cited

U.S. PATENT DOCUMENTS

| | | | |
|---|---|---|---|
| 5,640,200 | A | 6/1997 | Michael |
| 2013/0139953 | A1 | 6/2013 | Galush et al. |

(Continued)

FOREIGN PATENT DOCUMENTS

| | | | |
|---|---|---|---|
| EP | 3109826 B1 | 2/2019 | |
| KR | 20120050060 A | * 5/2012 | |

(Continued)

OTHER PUBLICATIONS

ALBION Dispensing Solutions, "Sealant and Adhesive Dispensers and Accessories for Construction and Industrial", 2021, URL: <https://web.archive.org/web/20210219025932/https://albioneng.com/>, 2 pages.

(Continued)

*Primary Examiner* — Stephen R Koziol
*Assistant Examiner* — Dylan J Sherrillo

(57) ABSTRACT

Systems of this disclosure enable building inspection using image analysis. The systems use images of a portion of a building to detect misapplications of tape applied to a substrate. An example system includes image capture hardware, a memory communicatively coupled to the image capture hardware, and processing circuitry communicatively coupled to the memory. The image capture hardware is configured to capture an image of a tape as applied to a
(Continued)

substrate. The memory is configured to store the image. The processing circuitry is configured to analyze the image according to a trained model, and to detect, based on the analysis of the image according to the trained model, detect a misapplication with respect to the tape as applied to the substrate.

18 Claims, 20 Drawing Sheets

(52) U.S. Cl.
CPC ............... *G06T 2207/20081* (2013.01); *G06T 2207/20084* (2013.01); *G06T 2207/30108* (2013.01)

(56) References Cited

U.S. PATENT DOCUMENTS

| | | | | |
|---|---|---|---|---|
| 2014/0147611 | A1* | 5/2014 | Ackerman, Jr. | E06B 1/62 156/219 |
| 2017/0135255 | A1* | 5/2017 | Eguchi | H05K 13/02 |
| 2019/0031923 | A1 | 1/2019 | Khurana et al. | |
| 2019/0313557 | A1* | 10/2019 | Matsushita | H05K 13/082 |
| 2020/0003098 | A1 | 1/2020 | Okajima et al. | |
| 2020/0219391 | A1 | 7/2020 | Smith et al. | |
| 2020/0410209 | A1* | 12/2020 | Zass | G06Q 10/06316 |

FOREIGN PATENT DOCUMENTS

| | | | |
|---|---|---|---|
| WO | 2015126931 | A1 | 8/2015 |
| WO | 2015183354 | A2 | 12/2015 |
| WO | 2016019248 | A1 | 2/2016 |
| WO | 2016106273 | A1 | 6/2016 |
| WO | 2017031275 | A1 | 2/2017 |
| WO | 2017112756 | A1 | 6/2017 |
| WO | 2018156631 | A1 | 8/2018 |
| WO | 2018220555 | A1 | 12/2018 |
| WO | 2019152621 | A1 | 8/2019 |
| WO | 2020003150 | A2 | 1/2020 |
| WO | 2021024206 | A1 | 2/2021 |
| WO | 2021033061 | A1 | 2/2021 |
| WO | 2021033111 | A1 | 2/2021 |
| WO | 2022219469 | A1 | 10/2022 |
| WO | 2022224060 | A1 | 10/2022 |

OTHER PUBLICATIONS

Binjin, "A Novel Construction Quality Control and Management Method Based on BIM and 3D Laser Scanning Technology", 2018 International Conference on 3D Immersion, pp. 1-8.

Cho, "3D as-is Building Energy Modeling and Diagnostics: A Review of the State-of-the-Art", 2015, Advanced Engineering Informatics, vol. 29, No. 2, pp. 184-195.

Department of Transportation, "MnCORS GNSS Network", 2021, URL: <https://web.archive.org/web/20210727121708/http://www.dot.state.mn.us/surveying/cors/>, 3 pages.

Golizadeh, "Barriers to Adoption of RPAs on Construction Projects: A Task-Technology Fit Perspective", 2019, Construction Innovation: Information, Process, Management, vol. 19, No. 2, pp. 149-169.

He, "Mask R-CNN", 2017, In Proceedings of the IEEE International Conference on Computer Vision, pp. 2961-2969.

International Search Report received for PCT International Application No. PCT/IB2022/053292, mailed on Jun. 27, 2022, 2 pages.

Milwaukee®, "Tool Official Site", 2021, URL: <https://web.archive.org/web/20211231001925/https://www.milwaukeetool.com/>, 2 pages.

Perez, "Deep Learning for Detecting Building Defects Using Convolutional Neural Networks", 2019, Sensors, vol. 19, No. 16, 3556, pp. 1-22.

Rakha, "Heat Mapping Drones: An Autonomous Computer-Vision-Based Procedure for Building Envelope Inspection Using Unmanned Aerial Systems (UAS)", 2018, Technology Architecture + Design, vol. 2, No. 1, pp. 30-44.

Ren, "A Generic Deep-Learning-Based Approach for Automated Surface Inspection", 2018, IEEE Transactions on Cybernetics, vol. 48, No. 3, pp. 929-940.

Wikipedia, "Image Segmentation", 2021, URL: <https://en.wikipedia.org/wiki/Image_segmentation>, 22 pages.

Zip System® Building Enclosures, "Huber Engineered Woods", 2021, URL: <https://web.archive.org/web/20211229191851/https://www.huberwood.com/zip-system>, 12 pages.

* cited by examiner

IMAGE ANALYSIS-BASED BUILDING INSPECTION

CROSS REFERENCE TO RELATED APPLICATIONS

This Application is a national-stage filing under 35 U.S.C. § 371 of International Patent Application No. PCT/IB2022/053292, filed 7 Apr. 2022, which claims the benefit of:

Provisional U.S. Patent Application No. 63/201,096, filed 12 Apr. 2021; and

Provisional U.S. Patent Application No. 63/201,094, filed 12 Apr. 2021, the entire disclosure of each of which is incorporated herein by reference.

TECHNICAL FIELD

This disclosure generally relates to the field of construction-related functionalities implemented using drones.

BACKGROUND

During or after construction, buildings are subject to inspection. If certain defects are detected during such an inspection, the defects may be marked for future identification and/or remediated, whether during a construction stage or at a post-completion stage.

SUMMARY

This disclosure describes systems configured for building inspection, building defect marking, and building defect remediation using drones. This disclosure primarily discusses the drone-hosted techniques as being performed with respect to a building envelope layer during construction of the building, as a non-limiting example. However, it will be appreciated that the various drone-hosted techniques of this disclosure are applicable to various facets of buildings, where the building is currently in construction or is fully constructed. Some examples of this disclosure leverage camera hardware integrated into the drone to obtain one or more images of the building (e.g., of the building envelope). According to these examples, systems of this disclosure analyze the image(s) using a trained machine-learning (ML) model to determine whether or not the portion of the building shown in the image(s) includes a defect that the ML model is trained to detect.

Some examples of this disclosure are directed to drone-hosted marking operations with respect to building defects. In these examples, the drone may include or be coupled to a marking subsystem, such as an ink dispensing subsystem or a self-adhesive paper dispensing subsystem. The systems of this disclosure may activate the marking subsystem to mark an area at or near an identified defect in these examples. Some examples of this disclosure are directed to drone-hosted remediation operations with respect to building defects. In these examples, the drone may include or be coupled to a remediation subsystem, such as an aerosol dispensing subsystem or an adhesive dispensing subsystem. The systems of this disclosure may activate the remediation subsystem to dispense the aerosol or adhesive (as the case may be) at an area associated with the identified defect in these examples.

In one example, a system includes image capture hardware, a memory communicatively coupled to the image capture hardware, and processing circuitry communicatively coupled to the memory. The image capture hardware is configured to capture an image of a tape as applied to a substrate or the image of a substrate. The memory is configured to store the image. The processing circuitry is configured to analyze the image according to a trained model, and to detect, based on the analysis of the image according to the trained model, detect a misapplication with respect to the tape as applied to the substrate or a defect in the substrate.

In another example, a method includes capturing, by image capture hardware, an image of a substrate or a tape as applied to a substrate. The method further includes analyzing, by processing circuitry communicatively coupled to the image capture hardware, the image according to a trained classification model. The method further includes detecting, by the processing circuitry, a defect in the substrate or a misapplication with respect to the tape as applied to the substrate based on the analysis of the image according to the trained model.

In another example, an apparatus includes means for capturing an image of a substrate or a tape as applied to a substrate, means for analyzing the image according to a trained model, and means for detecting a defect in the substrate or a misapplication with respect to the tape as applied to the substrate based on the analysis of the image according to the trained model.

In another example, a computer-readable storage device is encoded with instructions. The instructions, when executed, cause processing circuitry of a computing device to receive, from image capture hardware, an image of a substrate or a tape as applied to a substrate, to store the image to the computer-readable storage device, to analyze the image according to a trained model, and to detect, based on the analysis of the image according to the trained model, a defect in the substrate or a misapplication with respect to the tape as applied to the substrate.

The systems of this disclosure provide several potential advantages over currently available solutions. By hosting image capture, defect marking, and defect remediation operations on a drone, the systems of this disclosure improve safety, and also improve data precision by reducing the occurrence of human error when workers are deployed to the field in varying weather/visibility conditions, and at potentially high elevations. The defect detection techniques of this disclosure execute a trained ML model (which, in various examples in accordance with this disclosure, may be a classification model, a detection model, or a segmentation model) to analyze image data of an area of a building, thereby reducing chances of human error where safety concerns are of high importance.

Moreover, the drone-hosted techniques of this disclosure may enhance the precision and completeness of the inspection, marking, or remediation, by leveraging the drone's maneuverability to inspect the building (or other structure) more thoroughly, and to perform inspection, marking, or remediation in areas that might be difficult for human workers to reach. In some examples, the drones of this disclosure are equipped with specialized image capture hardware, thereby providing images that the trained models of this disclosure can analyze with greater accuracy than the human eye can interpret standard images or direct views of the building. In this way, the drone-hosted techniques of this disclosure may improve data precision and/or process completeness, while also providing the practical application of enhanced safety.

The details of one or more examples of the disclosure are set forth in the accompanying drawings and the description below. Other features, objects, and advantages of the disclosure will be apparent from the description and drawings, and from the claims.

It is to be understood that the examples may be utilized, and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
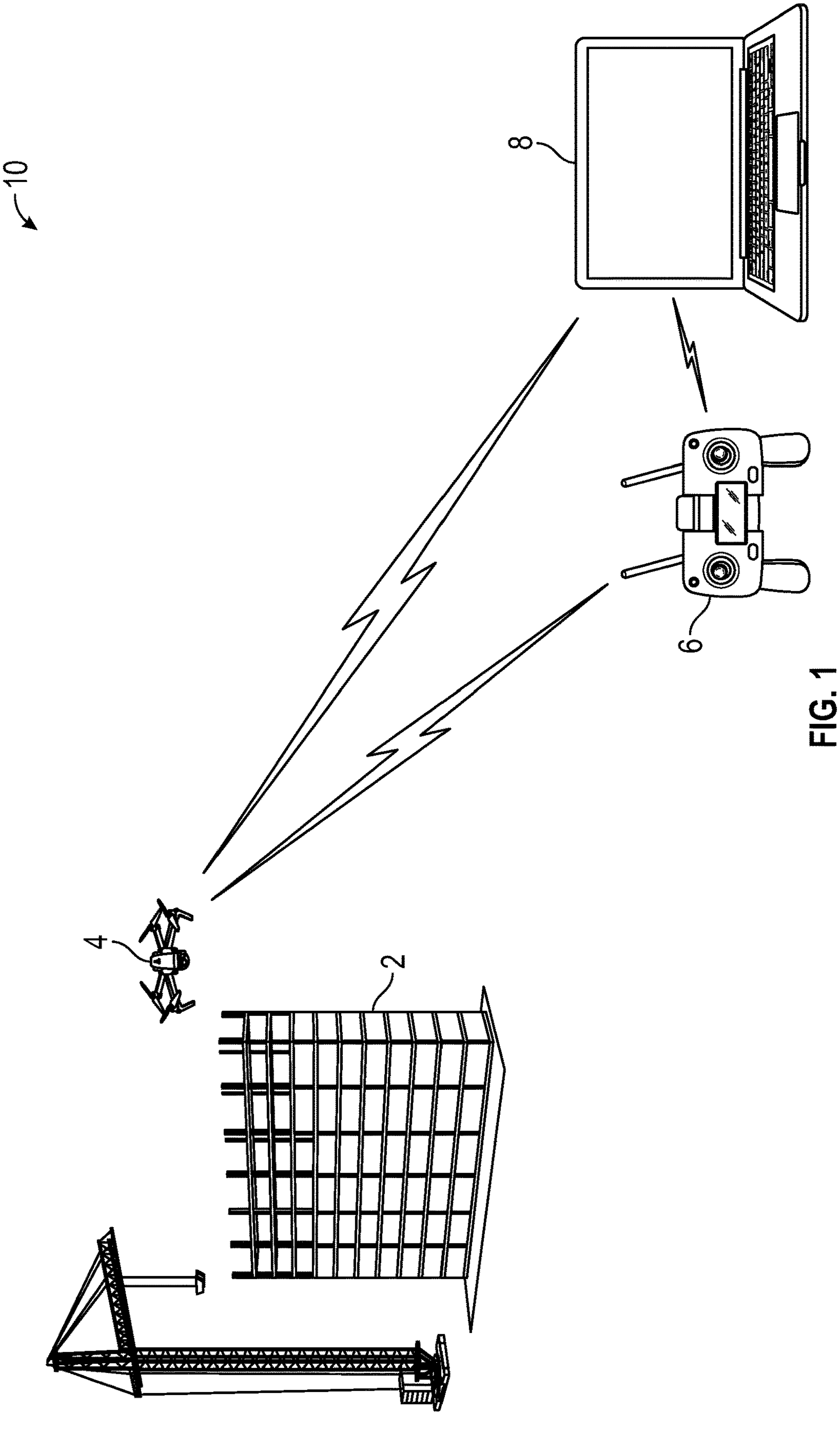
FIG. 1 is a conceptual diagram illustrating an example of a system, aspects of which are configured to perform one or more techniques of this disclosure.

FIG. 1 is a conceptual diagram illustrating an example of a system 10, aspects of which are configured to perform one or more techniques of this disclosure. System 10 includes a building 2, a drone 4, a drone controller 6, and a computing system 8. Building 2 is illustrated as being in a construction phase, during a time at which the exterior-facing exposed layer being an "envelope layer" or "building envelope." While the techniques of this disclosure are described as being performed with respect to building envelopes as a non-limiting example, it will be appreciated that various techniques of this disclosure are applicable to other substrates as well. Examples of other substrates include finished building walls, whether exterior or interior, non-building structures such as walls, fences, bridges, ships, aircraft, cellular phone towers, and so on.

A building envelope refers to a physical barrier between the conditioned environment and the unconditioned environment of the respective building (in this case, building 2). In various examples, a building envelope may be referred to as a "building enclosure," an "envelope layer" as mentioned above, or a "weatherproof barrier" ("WPB"). The building envelope shields the interior of the building from outdoor elements, and plays a vital role in climate control. Aspects of the element-shielding and climate control functions of the building envelope include rain blocking, air control, control of heat transfer, and vapor shielding. As such, the integrity of the building envelope is essential to the safety and inhabitability of building 2.

With respect to tasks such as inspecting a building envelope for defects, marking any detected defects, or remediating any detected defects of the building envelope, precision and completeness are vital to the goal of maintaining integrity. With the increasing size, design complexity, and crowding of buildings, manual execution of these tasks is becoming more and more difficult. System 10 may leverage the maneuverability of drones (e.g., drone 4) to perform one or more of building envelope inspection, defect marking, and/or defect remediation. System 10 may also leverage specialized computing capabilities to identify the potential presence of defects, the location of any such potential defects, and/or the parameters of the operations performed to remediate any such potential defects. These specialized computing capabilities may be provided by way of computing or processing hardware of one or more of drone 4, drone controller 6, and/or computing system 8. In some examples, aspects of system 10 may leverage cloud computing resources to implement the specialized computing capabilities in a distributed manner.

Drone 4 may represent one or more types of unmanned aircraft system (UAS). In various examples, drone 4 may also be referred to as one or more of an autonomous aircraft, an automatically piloted vehicle, a remotely operated aircraft, a remotely piloted aircraft, a remotely piloted aircraft system, a remotely piloted aerial system, a remotely piloted aerial vehicle, a remotely piloted system, a remotely piloted vehicle, a small unmanned aircraft system, a small unmanned aircraft, an unmanned flight system, an unmanned air vehicle, a remotely piloted transport system, or the like.

Processing circuitry of drone controller 6 and/or processing circuitry of computing system 8 may formulate navigation instructions for drone 4, based on the location of areas of building 2 that are subject to inspection, defect marking, or defect remediation by drone 4 and its respective subsystems. In turn, the processing circuitry may invoke wireless interface hardware of drone controller 6 or computing system 8, as the case may be, to transmit the navigation instructions to wireless interface hardware of drone 4. The wireless interface hardware of drone 4, drone controller 6, and computing system 8 may represent communications hardware that enables wireless communication with other devices that are also equipped with wireless interface hardware, such as by enabling wireless communications between two or more of drone 4, drone controller 6, and/or computing system 8

Drone 4 may be equipped with a motion guide that controls the movement of drone 4, such as the flightpaths of drone 4. Drone 4 may also be equipped with control logic that receives, via the wireless interface hardware of drone 4, the navigation instructions from either drone controller 6 or computing system 8. The control logic may use the navigation instructions received from drone controller 6 or computing system 8 to navigate drone 4 to areas proximate to certain portions of building 2. In various examples consistent with aspects of this disclosure, the processing circuitry of drone controller 6 and/or computing system 8 may form the navigation instructions based on areas of building 2 that are to be inspected for objects of potential survey interest (OoPSIs), or based on areas associated with previously identified OoPSIs, to facilitate marking and/or remediation of the identified OoPSIs.

Computing system 8 may include, be, or be part of one or more of a variety of types of computing devices, such as a mobile phone (e.g. a smartphone), a tablet computer, a netbook, a laptop computer, a desktop computer, a personal digital assistant ("PDA"), a wearable device (e.g., a smart watch or smart glasses), among others. In some examples, computing system 8 may represent a distributed system that includes an interconnected network of two or more such devices. Computing system 8 is illustrated as a laptop computer in FIG. 1 as a non-limiting example in accordance with the aspects of this disclosure.

Drone controller 6, in many examples, represents a radio control transmitter or transceiver. Drone controller 6 is configured to process user inputs received via various input hardware (e.g., joysticks, buttons, etc.), formulate the navigation instructions described above, and transmit the navigation instructions via communications interface hardware to communications interface hardware (e.g., a receiver) of drone 4 substantially in real time. The complementary communications interfaces of drone 4 and drone controller 6 may communicate over one or more predetermined frequencies.

In this way; aspects of system 10 leverage the flight capabilities and maneuverability of drone 4 to inspect building 2, and in some scenarios, to mark and/or repair OOPSIs OBJ OBJ OBJ). Aspects of system 10 also augment the inspection process of building 2 by improving inspection throughput and/or providing data to an inspector, and in some examples, by providing visual (e.g., still photo and/or video) record for owners, insurers, contractors, forepersons, etc.

Figure 2:
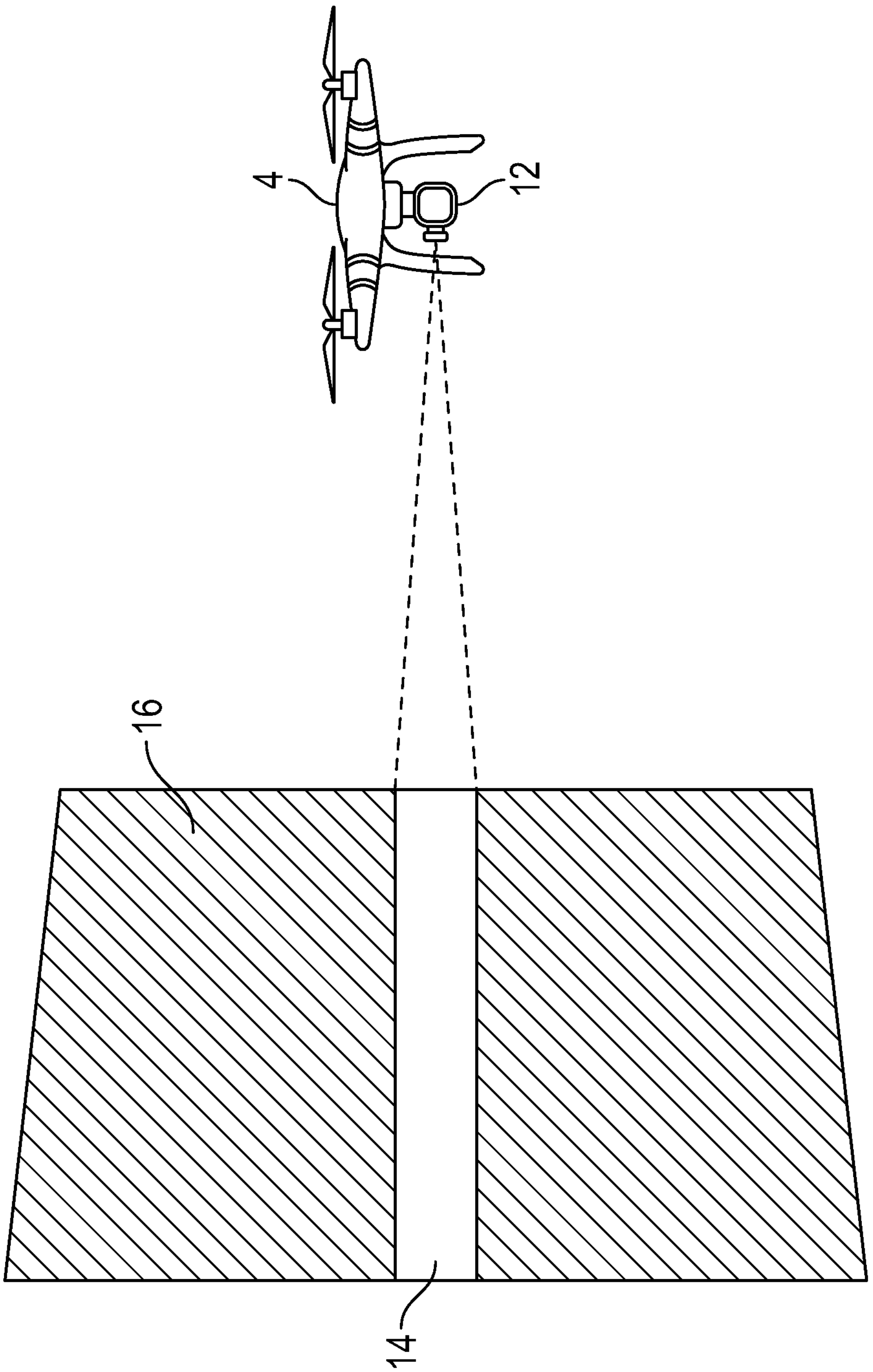
FIG. 2 is a conceptual diagram illustrating drone-hosted tape application inspection aspects of this disclosure.

FIG. 2 is a conceptual diagram illustrating drone-hosted tape application inspection aspects of this disclosure. FIG. 2 illustrates substrate 16, which may, in some examples, represent a portion of an exterior surface of building 2, such as a wall (as illustrated), a roof, etc. In this example, substrate 16 is outfitted with tape 14. Tape 14 may represent any of various types of adhesive-coated materials. This disclosure primarily describes non-limiting examples in which tape 14 represents a so-called "flashing tape" that is commonly used to seal seams, tears, or other discontinuities in building exteriors such as substrate 16. In some examples, substrate 16 may represent a surface coated with an adhesive layer, such as a roll-on adhesive that leaves an outward-facing adhesive layer on a surface. Features of some non-limiting examples of one or more of tape 14, sealants with which substrate 16 may be coated, and/or outward-facing adhesives with which substrate 16 may be coated are described in published U.S. Patent Applications with Publication Numbers US20130139953A1, US2020003098A1, and US20190031923A1, and International Patent Applications with Publication Numbers WO2021033111A1, WO2021024206A1, WO2016019248A1, WO2016106273A1, WO2015183354A2, WO2015126931A1, WO2017031275A1, WO2019152621A1, WO2017112756A1, WO2017031275A1, WO2018156631A1, and WO2018220555A1, the entire disclosure of each of which is incorporated herein by reference In the example of FIG. 2, drone 4 is equipped with image capture hardware 12. In some examples, image capture hardware 12 represents one or more types of digital camera, such as a camera configured to store captured still images and/or moving pictures in a digital format (e.g., as .jpeg files, .png files, .mp4 files, etc.). Based on navigation instructions received from drone controller 6 or computing system 8, the control logic of drone 4 may cause the motion guide to navigate drone 4 to areas that are proximate to particular areas of tape 14 as applied to substrate 16. Upon detecting that drone 4 is positioned and oriented sufficiently to enable image capture by image capture hardware 12, the control logic may activate image capture hardware 12 to capture one or more images of portions of tape 14 that are in view of the lens hardware of image capture hardware 12.

According to some implementations consistent with this disclosure, the control logic may operate an actuator subassembly of drone 4 to activate or depress a button of image capture hardware 12 if image capture hardware 12 is a discrete camera that is physically coupled to drone 4. According to other implementations consistent with this disclosure, the control logic may operate logic of image capture hardware 12 to activate image capture capabilities if image capture hardware 12 is integrated into drone 4. In turn, image capture hardware 12 may provide the captured digital image(s) to processing circuitry of drone 4 and/or to processing circuitry of computing system 8, via various types of communication channels appropriate for transferring digital image data using wireless or hardwired means.

As used herein, processing circuitry may include one or more of a central processing unit (CPU), graphics processing unit (GPU), a single-core or multi-core processor, a controller, a digital signal processor (DSP), an application specific integrated circuit (ASIC), a field-programmable gate array (FPGA), fixed function circuitry; programmable circuitry, any combination of fixed function and programmable circuitry; discrete logic circuitry; or integrated logic circuitry. The processing circuitry of drone 4 or computing system 8 may analyze the image(s) received from image capture hardware 12 according to a trained ML model and, based on the analysis, detect a misapplication of tape 14 (or a portion thereof) as applied to substrate 16. In various examples of this disclosure, the processing circuitry may execute a trained classification model, a trained detection model, or a trained segmentation model.

In some examples, the processing circuitry of drone 4 or computing system 8 may leverage cloud computing capabilities to execute the trained model. In various examples, the trained model may be a trained deep learning model, such as a deep neural network. One example of a trained deep neural network that the processing circuitry may execute to analyze images of tape 14 in accordance with this disclosure is a trained convolutional neural network (CNN), thereby applying computer vision-oriented machine learning technology to detect a misapplication of tape 14 as applied to substrate 16. Aspects of CNNs described in International Patent Applications with Publication Numbers WO2021/033061A1 and WO2020/003150A2, the entire disclosure of each of which is incorporated herein by reference. One example of a trained CNN that the processing circuitry of drone 4 or computing system 8 may execute to perform the defect detection aspects of this disclosure is a Mask R-CNN.

Figure 3A:
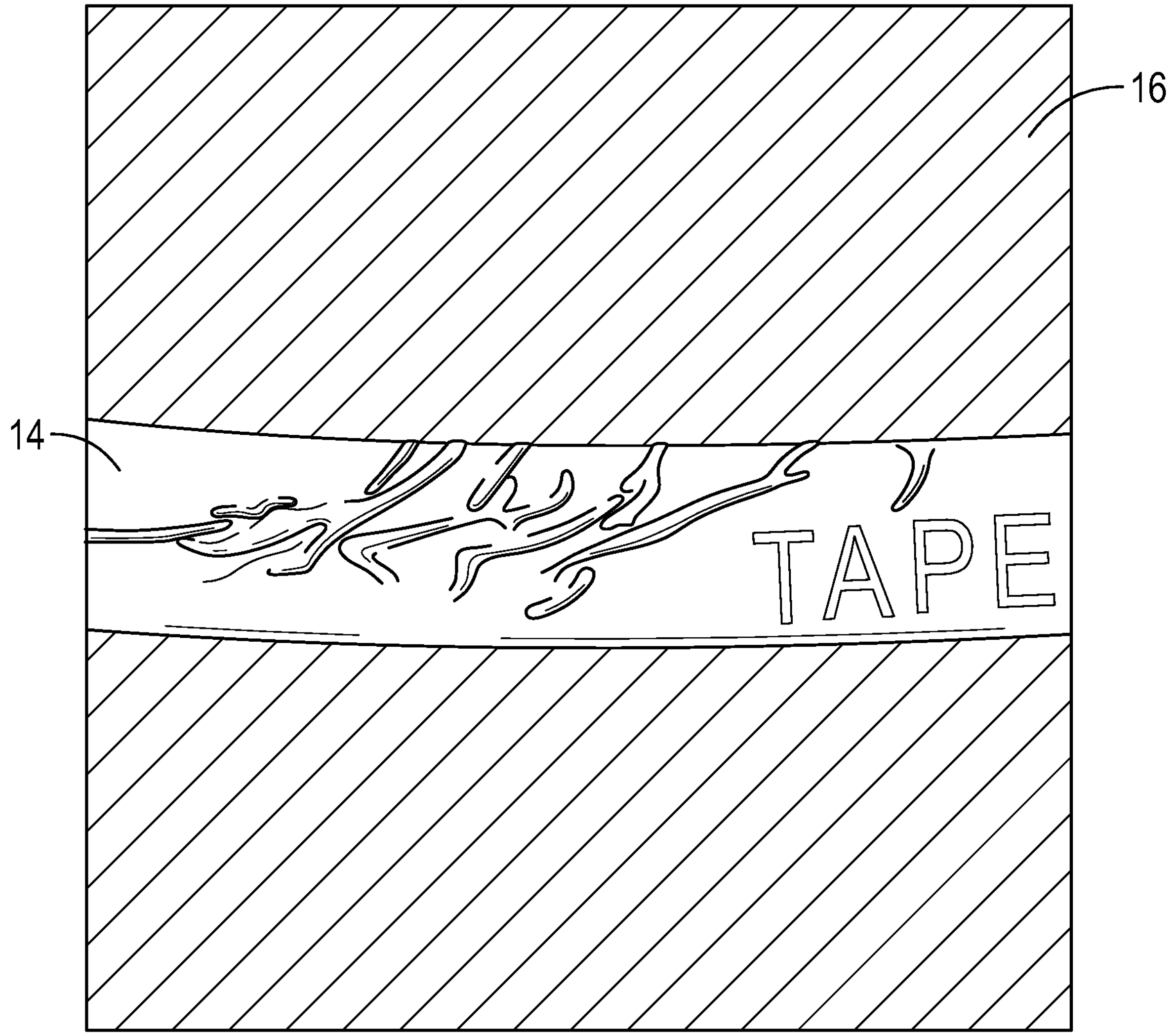
FIGS. 3A & 3B are conceptual diagrams illustrating further details of misapplications of a tape to a substrate that aspects of the system of FIG. 1 may detect using the techniques of this disclosure.
Figure 3B:
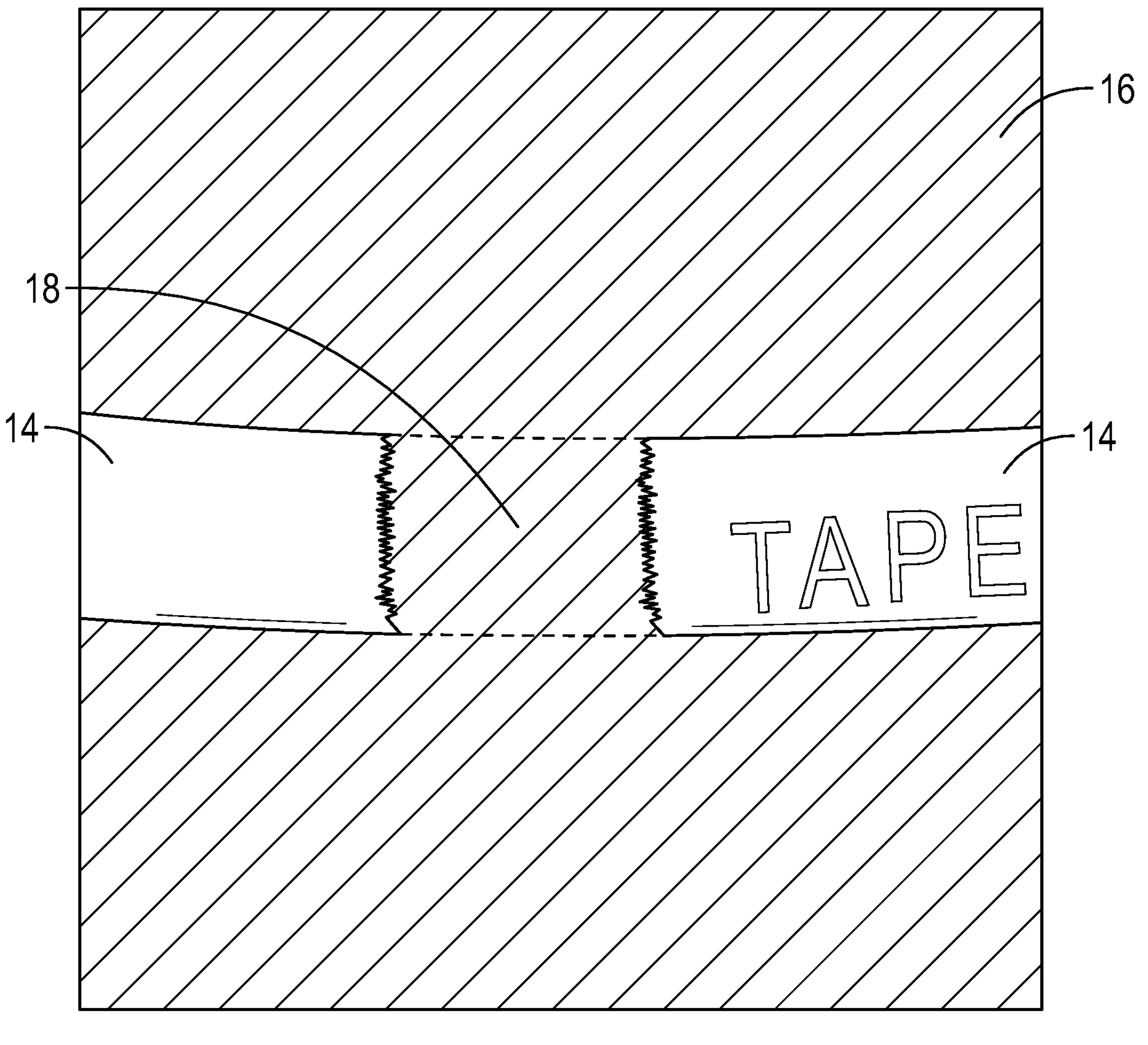

FIGS. 3A & 3B are conceptual diagrams illustrating further details of misapplications of tape 14 to substrate 16 that aspects of system 10 may detect using the techniques of this disclosure. FIG. 3A shows one example of a tape application defect that the processing circuitry of drone 4 or computing system 8 may detect using the trained models of this disclosure. Some of the defects shown in FIG. 3A correspond to what is referred to herein as "fishmouth creasing." As used herein, fishmouth creasing refers to a tape misapplication that involves a non-adhesion of an edge of tape 14 from substrate 16, with an adjacent non-adhesion or non-flushness of interior portions of tape 14 with substrate 16. The opening caused by the edge non-adhesion and the adjacent protruding crease of tape 14 as applied to substrate 16 creates an opening for fluids (air, water, etc.) to ingress and compromise the functionality of tape 14 as applied to substrate 16.

Another type of defect that the processing circuitry of drone 4 or computing system 8 may detect by executing the trained models include "tenting." which refers to a non-adhesion and protrusion of an internal protrusion of tape 14 with respect to substrate 16 (e.g., without the edge ingress point of the fishmouth crease shown in FIG. 3A). Tenting of tape 14 may be caused by faulty application procedure, or by applying tape 14 on top of an "underdriven fastener." An underdriven fastener refers to a nail, screw; bolt, or other type of fastener that is partially driven into substrate 16, but with the head of the fastener protruding out of substrate 16 to a magnitude that causes tape 14 to tent when applied above the fastener's head.

FIG. 3B shows another example of a tape application defect that the processing circuitry of drone 4 or computing system 8 may detect using the trained models of this disclosure. The defect shown in FIG. 3A is referred to herein as a "missing tape segment." Missing tape segment 18 illustrates a misapplication of tape 14 that leaves a portion of substrate 16 exposed when it should not be exposed, for indoor conditioning concerns or otherwise. For example, missing tape segment 18 may expose a substrate scam or substrate patch that should not be exposed to the elements. The processing circuitry of drone 4 or computing system 8 may also execute the trained models of this disclosure to detect discontinuities in tape 14 that are different from missing tape segment 18. As an example, the processing circuitry of drone 4 or computing system 8 may execute the trained models of this disclosure to detect tears that do not span the entire breadth of tape 14, or scratches that do not expose substrate 16 under tape 14, but instead, compromise or diminish the efficacy of tape 14. The processing circuitry of drone 4 or computing system 8 may also execute the trained models of this disclosure to analyze images received from image capture device 12 to detect other types of misapplications of tape 14 as applied to substrate 16, such as insufficient adhesions (other than the examples discussed above), insufficient tension (e.g., as may cause "slack" with respect to tape 14 if tape 14 is not rolled down with enough force when being applied to substrate 16), etc. In some examples, the processing of drone 4 or computing system 8 (whether locally or by leveraging cloud computing resources) may analyze images of tape 14 to determine branding information, standards-compliance information, etc. with respect to tape 14, whether or the information is represented in a manner that is visible to the human eye without image processing.

FIGS. 4A-4D are diagrams illustrating various deep learning-generated image labels that the trained models of this disclosure may generate. Each of FIGS. 4A-4D illustrates a model output that the processing circuitry of drone 4 or computing device 8 may generate by executing trained models of this disclosure at varying levels of computational complexity. FIGS. 4A-4D, in sequence, illustrate an ascending order of computational complexity with respect to generating the image labels of this disclosure.

Figure 4A:
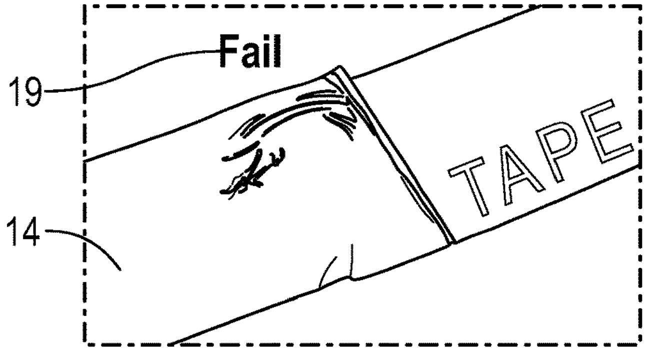
FIGS. 4A-4D are diagrams illustrating various deep learning-generated image labels that the trained classification models of this disclosure may generate.
Figure 4B:
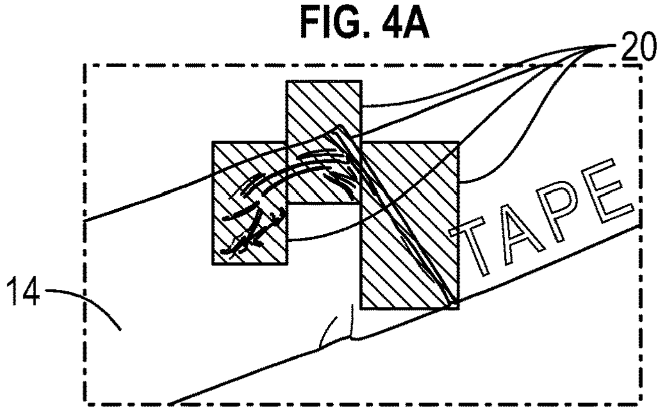

In the example of FIG. 4A, a trained classification model of this disclosure implements full image classification on an image of tape 14 as applied to substrate 16. In this example, the processing circuitry of drone 4 or computing system 8 returns a "fail" classification in the form of image label 19. The "fail" result of image label 19 is the result or model output generated by the trained classification model based on detecting at least one defect at any location in the image received from image capture hardware 12. In the example of FIG. 4B, a trained detection model of this disclosure implements sub-image classification on the image of tape 14 as applied to substrate 16. In this example, the trained detection model of this disclosure breaks the image into multiple sub-images 20, and classifies each respective sub-image 20 with a "pass" or "fail" label as was done for the entire image as a whole in the example of FIG. 4A by way of image label 19.

Figure 4C:
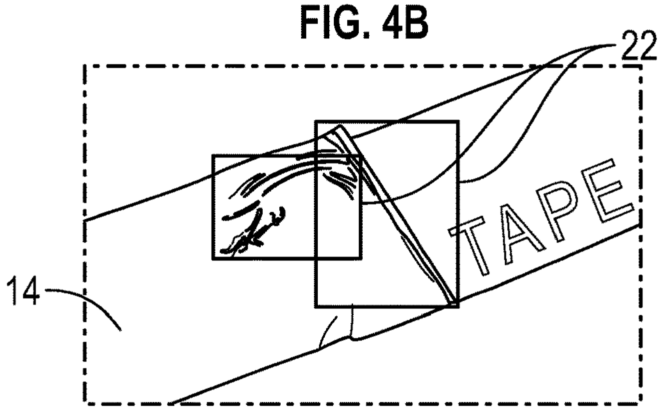

In the example of FIG. 4C, the trained detection model of this disclosure implements object detection on the image of tape 14 as applied to substrate 16. According to the object detection-based techniques shown in FIG. 4C, the trained detection model of this disclosure returns rectangular bounding boxes (bounding boxes 22) around areas of the image that show defects in tape 14 as applied to substrate 16, and for which the trained detection model of this disclosure returns respective "fail" results as model outputs. As shown in the non-limiting example of FIG. 4C, the trained detection model may implement object detection to return multiple (and potentially, as in the case of FIG. 4C, overlapping) bounding boxes 22.

Figure 4D:
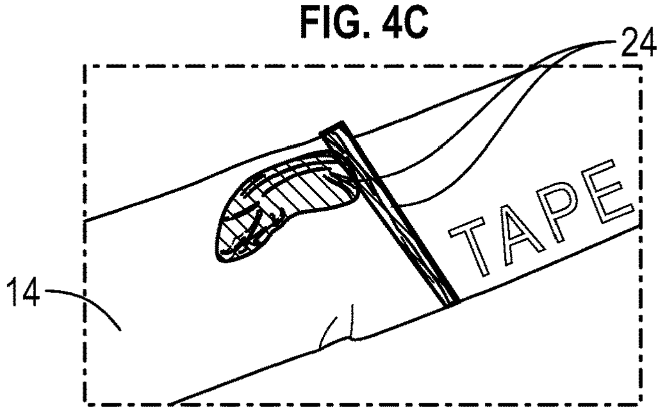

In the example of FIG. 4D, a trained segmentation model of this disclosure implements image segmentation on the image of tape 14 as applied to substrate 16. According to the image segmentation-based techniques shown in FIG. 4D, the trained segmentation model of this disclosure returns a pixel-by-pixel labeling of defects with respect to tape 14 as applied to substrate 16, as represented in the image obtained from image capture hardware 12. FIG. 4D shows defect segments 24, which the trained segmentation model of this disclosure identifies based on a pixel-by-pixel analysis of the image received from image capture hardware 12 showing tape 14 as applied to substrate 16.

FIGS. 3A-4D, in various examples, represent images expressed in various color spaces, such as a red-green-blue (RGB) color space, a grayscale color space, a black and white color space, or various other chromaticity spaces that are partially or wholly discernible to the human eye. In these examples, image capture device 12 represents digital camera hardware configured to produce digital image data in any of these color spaces. In other examples, image capture hardware 12 may represent a so-called "polarization camera." A polarization camera may produce image data in a variety of formats by performing calculations on data output by polarization sensors of the polarization camera.

Figure 5:
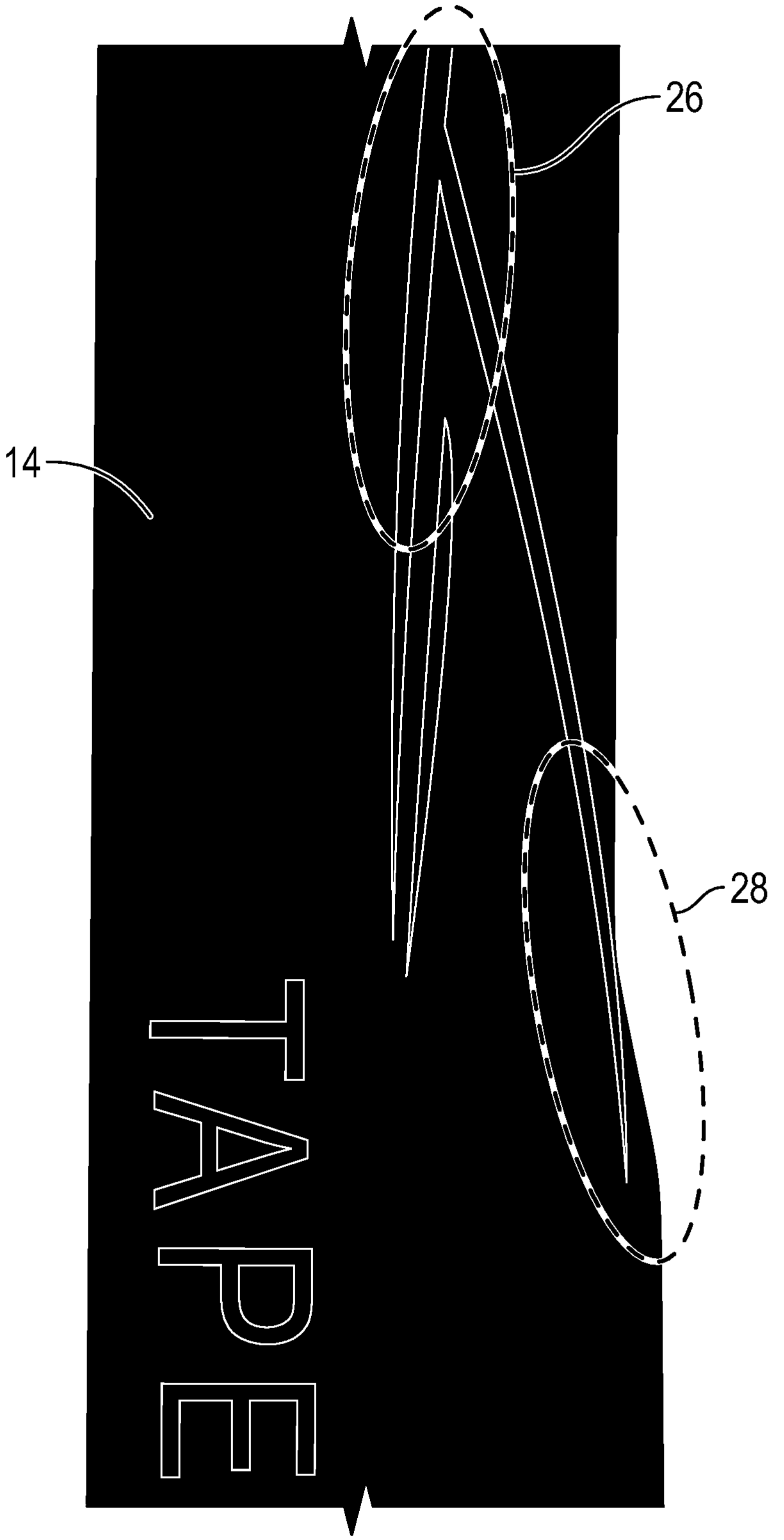
FIG. 5 is a conceptual diagram illustrating a polarization image that the system of FIG. 1 may analyze to detect defects with respect to a tape as applied to a substrate, in accordance with aspects of this disclosure.

FIG. 5 is a conceptual diagram illustrating a polarization image that system 10 may analyze to detect defects with respect to tape 14 as applied to substrate 16, in accordance with aspects of this disclosure. In examples in which image capture hardware 12 represents a polarization camera, the processing circuitry of drone 4 or computing system 8 may analyze various data output by image capture hardware 12 to detect defects with respect to tape 14 as applied to substrate 16. As examples, the processing circuitry of drone 4 or computing system 8 may execute trained classification models of this disclosure to analyze the following two values: unpolarized light in the polarization image, and the degree of linear polarization (DoLP) exhibited in the polarization image. FIG. 5 shows a preprocessed or processed polarization image containing computed DoLP data for each pixel in each color channel, which trained models of this disclosure may utilize to detect the illustrated creasing-based application defects of tape 14 with an enhanced level of confidence.

In some non-limiting examples in which image capture hardware represents a polarization camera, image sensor hardware of image capture hardware 12 includes four polarization filters oriented at 0 degrees, 45 degrees, 90 degrees, and 135 degrees, respectively. Using a notation in which the four images obtained via the four polarization filters are denoted by $I_0$, $I_{45}$, $I_{90}$, and $I_{135}$, the polarization camera of image capture hardware 12 may compute Stokes vectors ($S_0$, $S_1$, $S_2$, and $S_3$) for each color channel according to the following calculations:

$$
\begin{aligned}
S_0 &= I_0 + I_{90} \\
S_1 &= I_0 - I_{90} \\
S_2 &= I_{45} - I_{135} \\
S_3 &= 1 - \sqrt{S_1^2 + S_2^2}
\end{aligned}
\tag{1}
$$

The Stokes vectors calculated according to equations (1) above represent, respectively, intensity images of unpolarized light ($S_0$), intensity images of linearly or horizontally polarized light ($S_1$), intensity images of light polarized at 45 degrees or 135 ($S_2$), and light that is circularly polarized ($S_3$). The polarization camera may calculate the DoLP using the above-described Stokes vectors according to equation (2) below:

$$
DoLP = \frac{\sqrt{S_1^2 + S_2^2 + S_3^2}}{S_0} \tag{2}
$$

The processing circuitry of drone 4 or computing system 8 may execute the trained models of this disclosure to use the degree of linear polarization to detect creasing-based defects, such as crease 26 and/or fishmouth crease 28, with respect to tape 14 as applied to substrate 16. Because the surface of tape 14 reflects light differently depending on the angle of the incident light being reflected, the presence and potentially the magnitude (in terms of angle outward from substrate 16) of crease 26 and/or fishmouth crease 28 cause the polarization-based measurements described above to vary.

The trained models of this disclosure, when executed, may use the DoLP calculated according to equation (2) to measure the consistency of the light reflections while remaining agnostic to the directionality of the light reflections. In various experiments, tape 14 had a black and glossy appearance. Regardless of the color of tape 14, the trained models of this disclosure may leverage glossiness traits of tape 14 to use DoLP to detect shadowing and other effects of creasing to detect defects in the application of tape 14 to substrate 16. Darker colors (such as black, used in the experiments described above) of tape 14 may further enhance the ability of the trained models of this disclosure to use DoLP to detect crease 26 and/or fishmouth crease 28 in tape 14 as applied to substrate 16.

FIGS. 6A-6D are diagrams illustrating various deep learning-generated image labels that the trained models of this disclosure may generate using the polarization image shown in FIG. 5. Each of FIGS. 6A-6D illustrates an image label that the processing circuitry of drone 4 or computing device 8 may generate by executing trained models of this disclosure on the polarization image of FIG. 5 at varying levels of computational complexity. FIGS. 6A-6D, in sequence, illustrate an ascending order of computational complexity with respect to generating the image labels using the polarization image of FIG. 5.

Figure 6A:
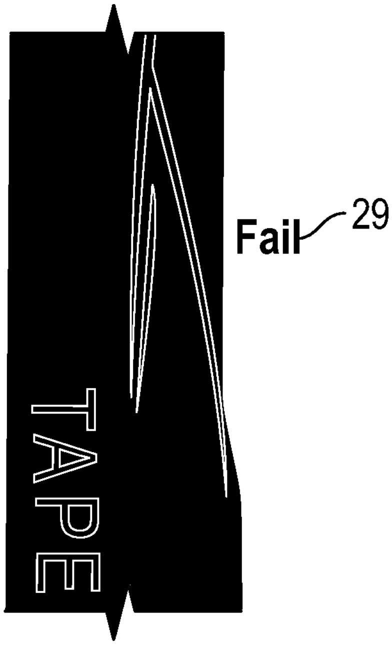
FIGS. 6A-6D are diagrams illustrating various deep learning-generated image labels that the trained classification models of this disclosure may generate using the polarization image shown in FIG. 5.

In the example of FIG. 6A, the trained classification model of this disclosure implements full image classification on the polarization image of tape 14 as applied to substrate 16. In this example, the processing circuitry of drone 4 or computing system 8 returns a "fail" result based on a full-image analysis of the polarization image, a condition satisfied upon detecting the first-detected of crease 26 or fishmouth crease 28, or both in the case of substantially simultaneous detection. The "fail" result of the model output is shown by way of image label 29 in FIG. 6A.

Figure 6B:
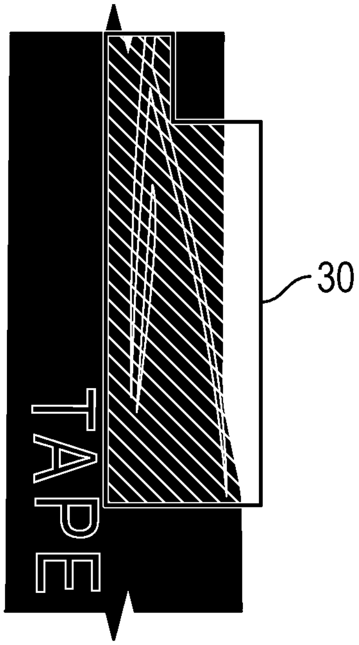

In the example of FIG. 6B, a trained detection model of this disclosure implements sub-image classification on the polarization image of tape 14 as applied to substrate 16. In this example, the trained detection model of this disclosure breaks the polarization image into multiple sub-images 30, and classifies each respective sub-image 30 as a "pass" or "fail" result, as was done for the entire polarization image as a whole in the example of FIG. 6A.

Figure 6C:
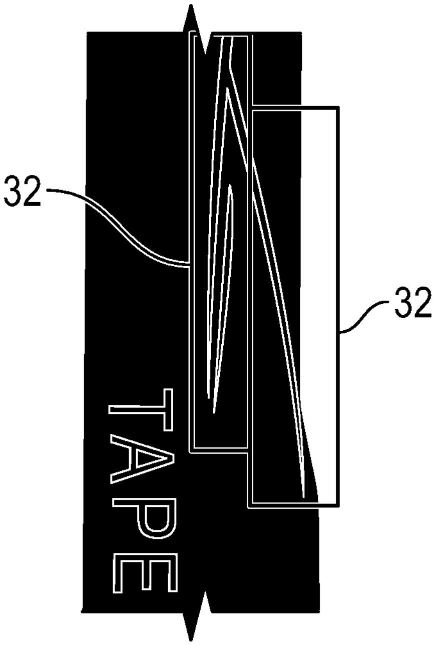

In the example of FIG. 6C, the trained detection model of this disclosure implements object detection on the polarization image of tape 14 as applied to substrate 16. According to the object detection-based techniques shown in FIG. 6C, the trained detection model of this disclosure returns rectangular bounding boxes (bounding boxes 32) around areas of the polarization image that show defects in tape 14 as applied to substrate 16. As shown in the non-limiting example of FIG. 6C, the trained detection model may implement object detection to return multiple (and potentially overlapping) bounding boxes 32.

Figure 6D:
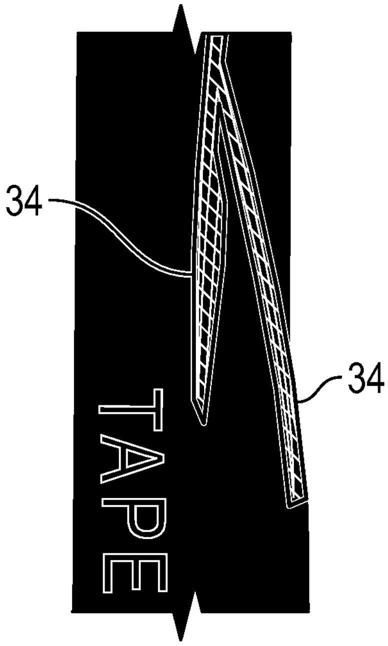

In the example of FIG. 6D, a trained segmentation model of this disclosure implements image segmentation on the polarization image of tape 14 as applied to substrate 16. According to the image segmentation-based techniques shown in FIG. 6D, the trained segmentation model of this disclosure returns a pixel-by-pixel labeling of crease 26 and fishmouth crease 28 with respect to tape 14 as applied to substrate 16, as represented in the image obtained from the polarization camera of image capture hardware 12. FIG. 6D shows defect segments 34, which the trained segmentation model of this disclosure identifies based on a pixel-by-pixel analysis of the light polarization exhibited in the polarization image of FIG. 5 showing tape 14 as applied to substrate 16.

Figure 7:
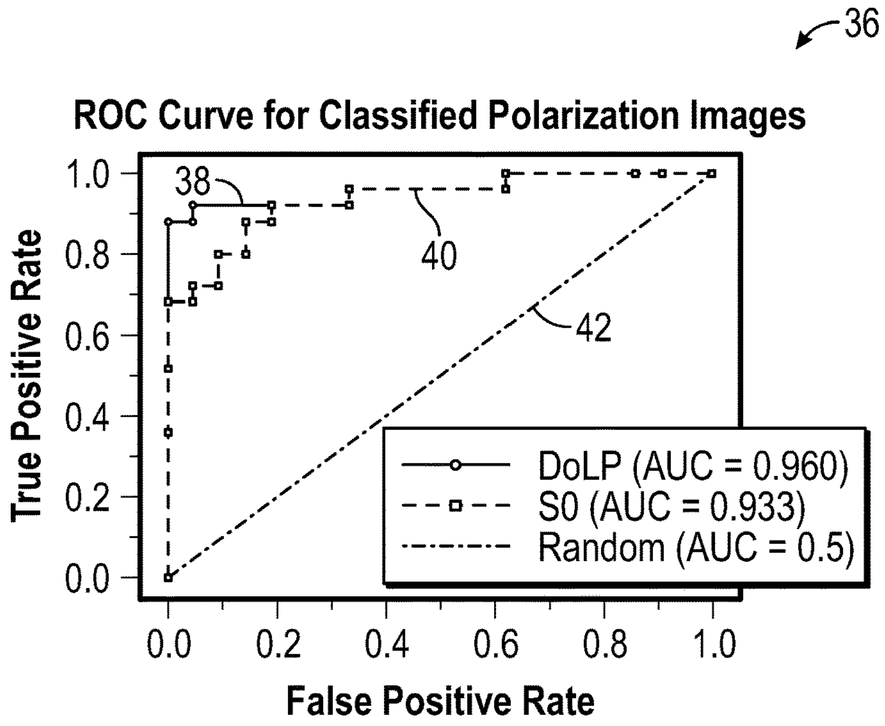
FIG. 7 is a graph illustrating aspects of polarization image analysis the trained classification model of this disclosure may perform to detect one or more defects with respect to a tape as applied to a substrate.

FIG. 7 is a graph 36 illustrating aspects of polarization image analysis the trained models of this disclosure may perform to detect one or more defects with respect to tape 14 as applied to substrate 16. Plot lines 38, 40, and 42 show the change in the true positive rate (for image classification) as a function of the corresponding false positive rate under different polarization image analysis scenarios. As a whole, graph 36 represents a receiver operator characteristic (ROC) curve generated from a test data set classified by trained models of this disclosure with respect to DoLP images and unpolarized ($S_0$) images.

As shown in graph 36, the area under the curve (AUC) is largest for DoLP plot line 38 (which corresponds to polarized images) when compared to the AUC for $S_0$ plot line 40 (which corresponds to unpolarized images) and random plot line 42 (which is provided as a baseline ground truth). The AUCs shown in FIG. 7 provide an overall measure of how discriminable the corresponding classes of images are in the datasets provided to the trained models of this disclosure. The AUC for DoLP plot line 38 is the greatest of the plot lines shown in graph 38, indicating that the trained models of this disclosure can discriminate crease 26 and/or fishmouth crease 28 more easily from DoLP images than using other images.

In this way; the techniques of this disclosure improve the accuracy of defect detection with respect to tape 14 as applied to substrate 16, by using trained models (e.g., one or more of a classification, detection, or segmentation model) of this disclosure. Whether image capture hardware 12 provides images in an RGB color space, a grayscale color space, or as a polarization image (or DoLP image), the trained models of this disclosure detect various types of defects with respect to tape 14 as applied to substrate 16 while improving data precision (e.g., by mitigating human error arising out of different eyesight or perception capabilities). While primarily described as being coupled to or integrated into drone 4 as a non-limiting use case example, it will be understood that the trained model-based image analysis techniques of this disclosure also provide these data precision enhancements in non-drone-based implementations as well.

For example, the trained models of this disclosure may use images captured by image capture hardware 12 in examples in which image capture hardware 12 is integrated into a mobile computing device, such as a smartphone, a tablet computer, a wearable computing device, etc. As another example, the trained models of this disclosure may use images captured by image capture device 12 if image capture device 12 is a dedicated digital camera or a dedicated polarization camera. In any of the non-drone-based examples listed above, the trained models of this disclosure may use images of tape 14 as applied to substrate 16 based on a manual capture of the images, such as by way of user input provided via an actuator button of a digital camera or a touch input provided at a touchscreen of the mobile computing device.

According to the drone-hosted implementations described above, the systems of this disclosure improve safety and also improve the ability to capture and analyze images from difficult-to access areas of substrate 16. For instance, by using drone 4 to transport image capture hardware 12 to potentially hazardous locations and capture images at these locations, system 10 alleviates or potentially eliminates the need to endanger human workers by requiring the workers to access these locations for manual image capture. Drone 4 may also provide maneuverability capabilities not otherwise available to equipment used by workers to survey substrate 16, thereby improving accessibility and tape inspection capabilities with respect to these areas of substrate 16.

Figure 8:
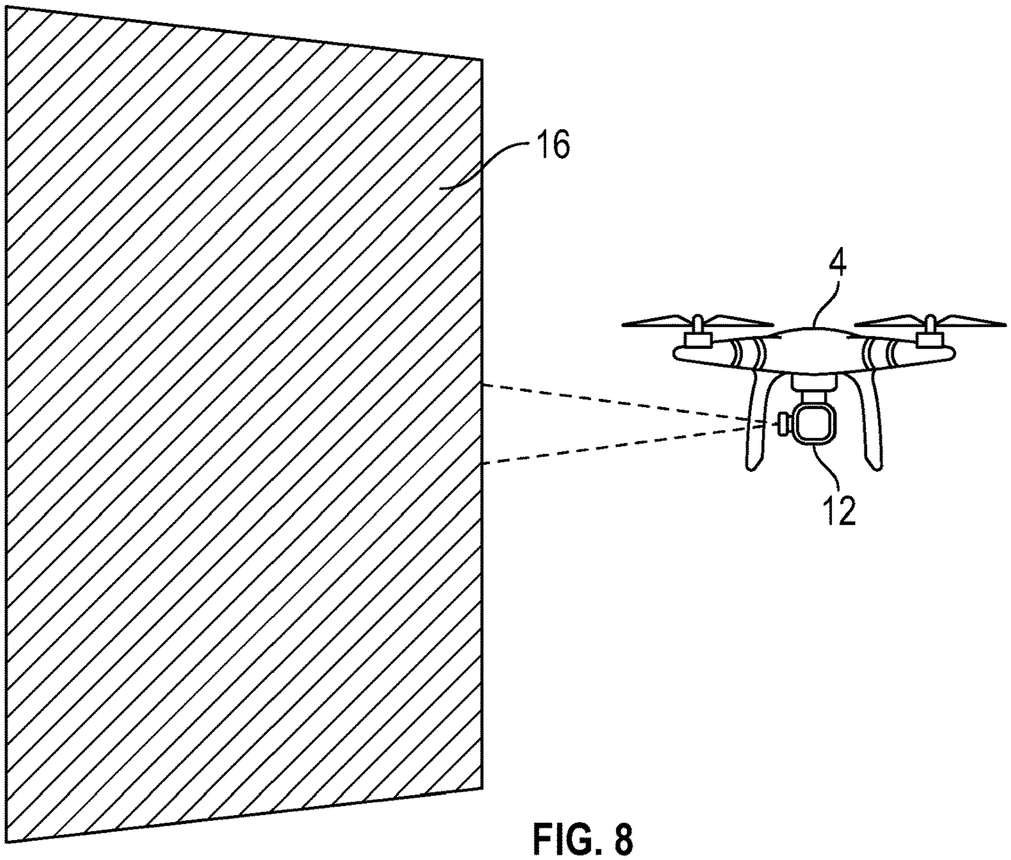
FIG. 8 is a conceptual diagram illustrating drone-hosted substrate inspection aspects of this disclosure.

FIG. 8 is a conceptual diagram illustrating drone-hosted substrate inspection aspects of this disclosure. Based on navigation instructions received from drone controller 6 or computing system 8, the control logic of drone 4 may cause the motion guide to navigate drone 4 to areas that are proximate to particular areas of substrate 16. Upon detecting that drone 4 is positioned and oriented sufficiently to enable image capture by image capture hardware 12, the control logic may activate image capture hardware 12 to capture one or more images of portions of substrate 16 that are in view of the lens hardware of image capture hardware 12.

The processing circuitry of drone 4 or computing system 8 may analyze the image(s) received from image capture hardware 12 by executing any of the trained models described above (e.g., one or more of classification models, detection models, or segmentation models) to detect a defect in substrate 16. As described above, in various examples the trained model may be a trained deep neural network, such as a trained CNN. In these and other examples, the trained models of this disclosure may apply computer vision-oriented machine learning technology to detect a defect in substrate 16.

Figure 9A:
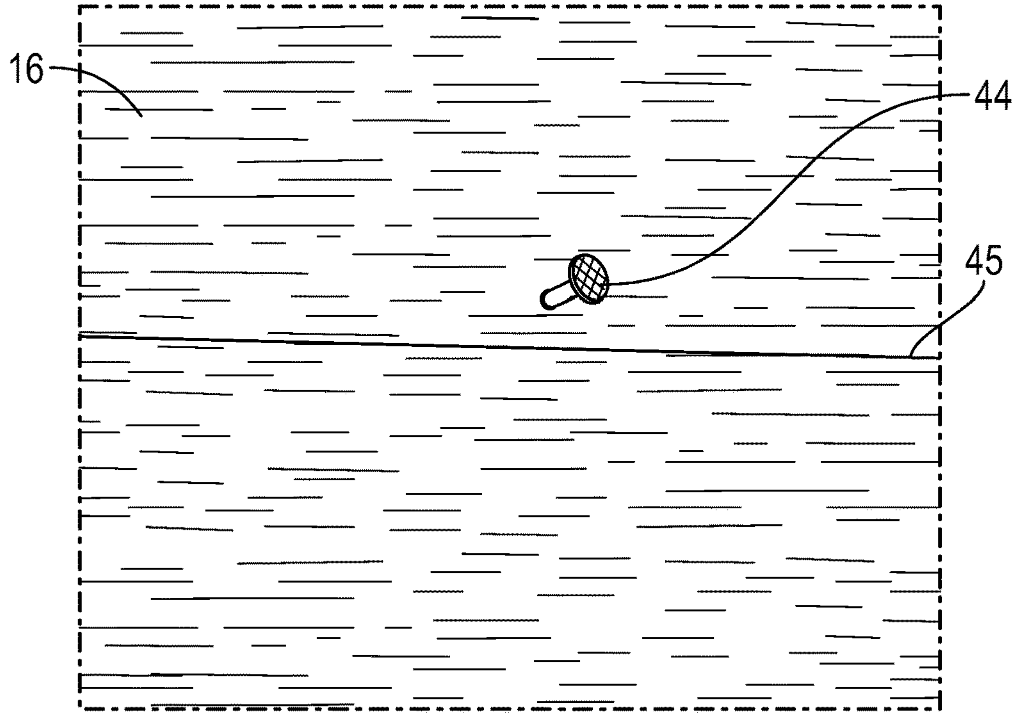
FIGS. 9A-9C are conceptual diagrams illustrating examples of an underdriven fastener in a substrate that the trained classification models of this disclosure may detect as a substrate defect.
Figure 9B:
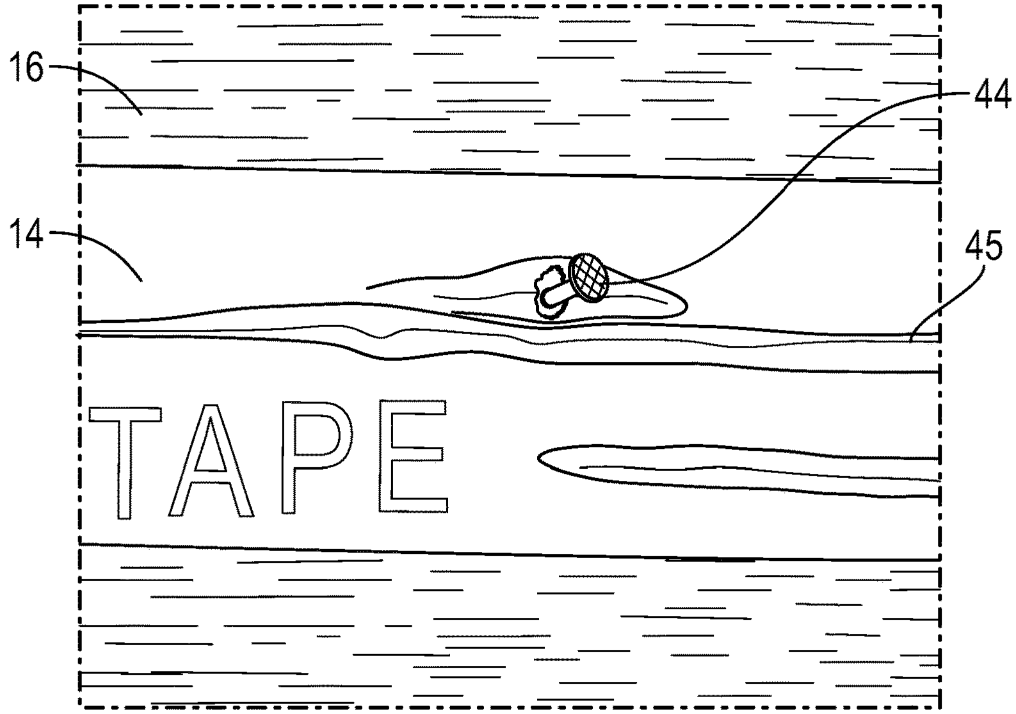
Figure 9C:
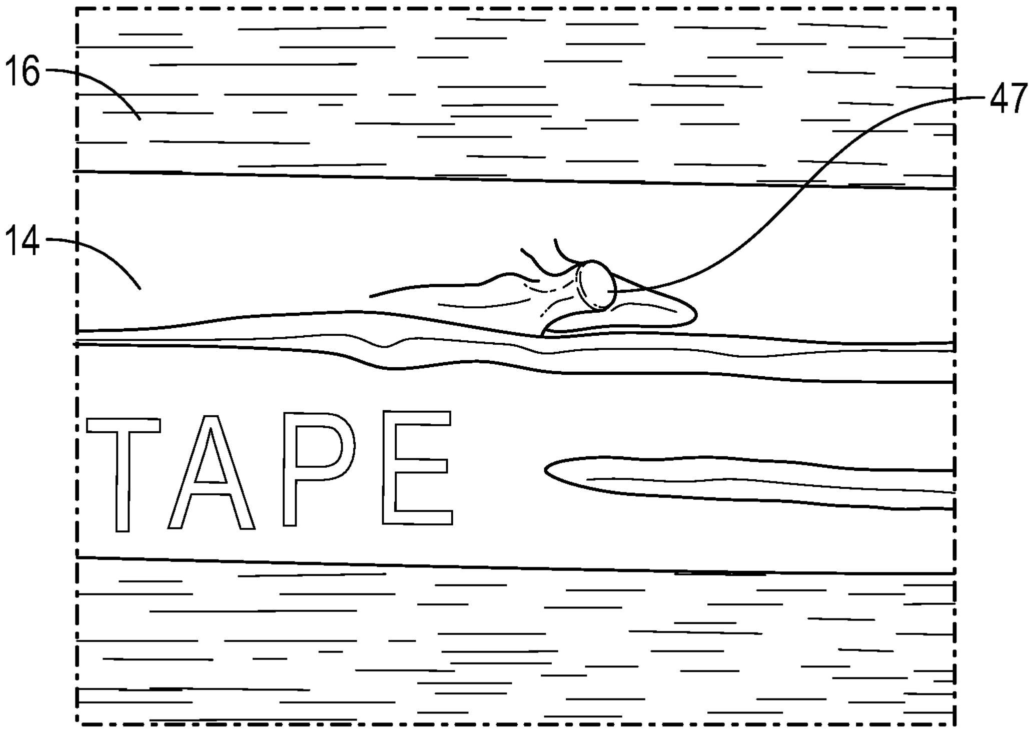

FIGS. 9A-9C are conceptual diagrams illustrating examples of an underdriven fastener in substrate 16 that the trained models of this disclosure may detect as a substrate defect. As used herein, the term "underdriven fastener" may refer to any of a nail, screw, bolt, tack, or other penetrative fastener that is not driven into substrate 16 to a sufficient depth or a sufficiently even depth to put fastener head 44 at a substantially flush position with the surface of substrate 16. Underdriven fasteners compromise the structural integrity of building envelopes or other structures represented by substrate 16. In instances in which tape 14 is applied over portions of substrate 16 surrounding and including the underdriven fastener shown in FIG. 9A, the protrusion of fastener head 44 may result in a tenting-based misapplication of tape 14 with respect to substrate 16.

Aspects of system 10 may capture the image of substrate 16 shown in FIG. 9A based on positioning of image capture hardware 12 within sufficient proximity to substrate 16 (e.g., by using drone 4 as shown in FIG. 8 or via manual positioning as discussed above with respect to other examples) and activating image capture hardware 12 to capture the image. The processing circuitry of drone 4 or computing system 8 may execute a trained model of this disclosure using the image of FIG. 9A to detect the underdriven fastener based on image data representing the position and/or orientation of fastener head 44. In this way, the trained models of this disclosure may; in its execution phase, provide a model output that indicates the underdriven status of the fastener of FIG. 9A, thereby enabling remediation of the underdriven fastener in a timely way.

For example, the underdriven fastener that a trained model of this disclosure detects based on the position and/or orientation of fastener head 44 may be remediated, based on the model output provided by the trained models of this disclosure, before further construction-related tasks are performed on top of substrate 16. In this example, the trained models of this disclosure reduce or potentially eliminate the need for additional dismantling or deconstruction purely to access the underdriven fastener before remediation. Instead, by detecting the underdriven fastener based on analyzing image data representing fastener head 44 during envelope layer inspection, the trained models of this disclosure enable remediation of the underdriven fastener in a timely and efficient manner.

The image shown in FIG. 9B illustrates defects in the effectiveness of tape 14 when applied over the underdriven fastener defect of substrate 16 shown by way of the protrusion of fastener head 44 in FIG. 9A. In examples in which a trained model of this disclosure is executed using the image of FIG. 9B, the model output enables various types of remediation, such as a sequence of removal of tape 14, remediation of the underdriven fastener evinced by the position and/or orientation of fastener head 44, and a reapplication of a new segment of tape 14 to the remediated substrate 16. In some examples, such as examples in which the trained model is also trained to detect defects in the application of tape 14 to substrate 16 (as described above with respect to FIGS. 1-6), the trained model may also communicate a model output indicating the misapplication (in this particular example, a tearing) of tape 14 at the location of fastener head 44.

The image shown in FIG. 9C illustrates defects in the effectiveness of tape 14 if applied over the underdriven fastener defect of substrate 16 shown by way of tenting 47 in tape 14 as applied to substrate 16. Tenting 47 occurs due to tape 14 being applied over an underdriven fastener embedded improperly in substrate 16, but without tension that causes the underdriven fastener to break or penetrate tape 14. In examples in which a trained model of this disclosure is executed using the image of FIG. 9C, the model output enables various types of remediation, such as a sequence of removal of tape 14, remediation of the tenting 47, such as by removing the underdriven fastener or driving the underdriven fastener to be flush with substrate 16, and a reapplication of a new segment of tape 14 to the remediated substrate 16 such that the new segment of tape 14 is flush with substrate 16.

Figure 10A:
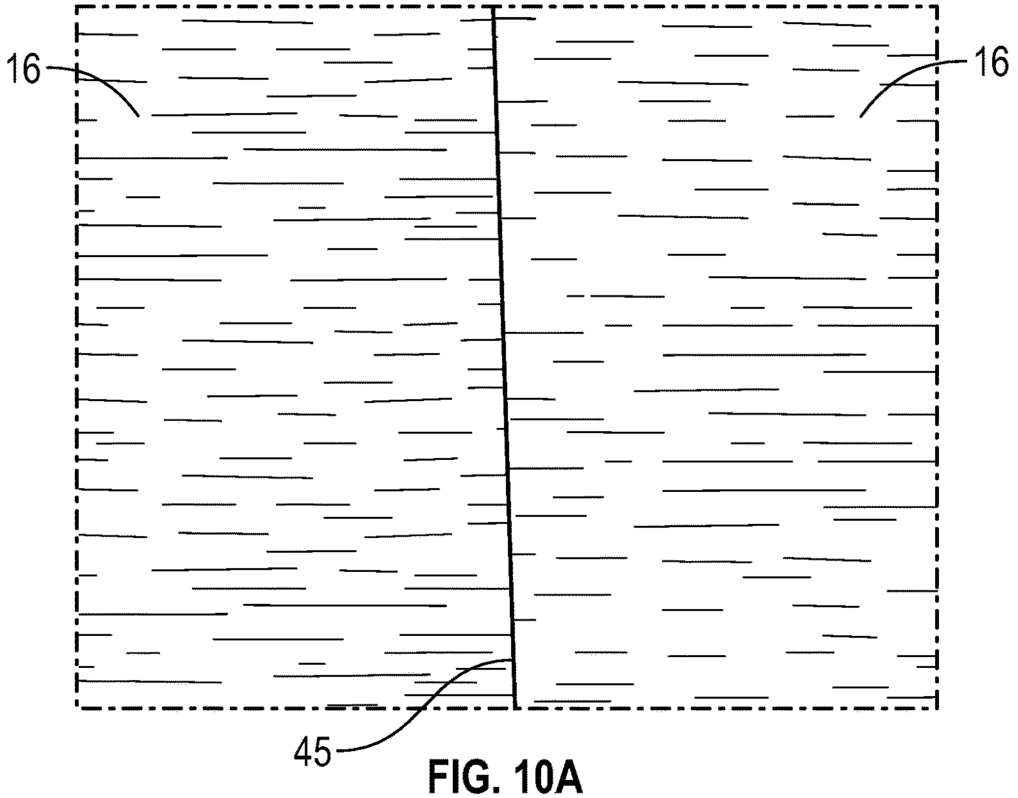
FIGS. 10A and 10B are conceptual diagrams illustrating examples of board disjointedness in a substrate that the trained classification models of this disclosure may detect as a substrate defect.
Figure 10B:
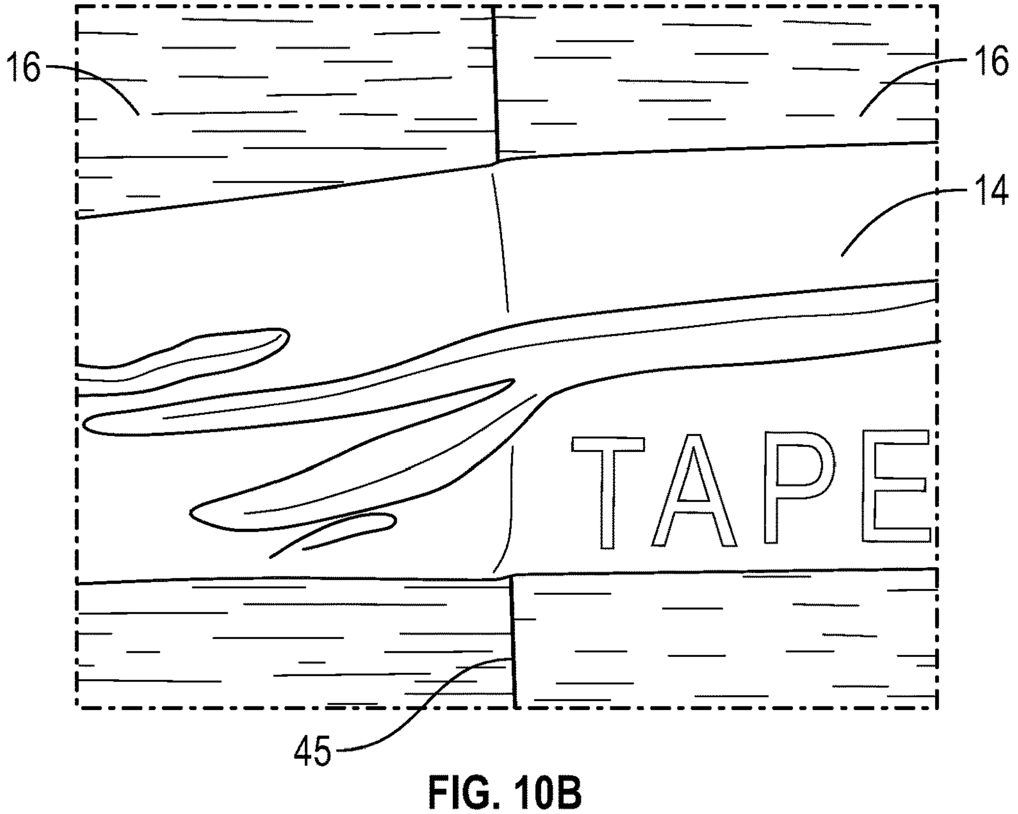

FIGS. 10A and 10B are conceptual diagrams illustrating examples of board disjointedness in substrate 16 that the trained models of this disclosure may detect as a substrate defect. As used herein, the term "disjointedness" refers to a non-flush junction (such as non-flush junction 45) between two adjacent boards of substrate 16. Non-flush junction 45 may represent a gap between boards that are not butted together tightly enough, or may represent a grade difference between adjacent boards positioned at different depths, or a combination of these defects. Board disjointedness arising out of conditions such as non-flush junction 45 compromise the structural integrity of building envelopes or other structures represented by substrate 16.

Aspects of system 10 may capture the image of substrate 16 shown in FIG. 10A based on positioning of image capture hardware 12 within sufficient proximity to substrate 16 (e.g., by using drone 4 as shown in FIG. 8 or via manual positioning as discussed above with respect to other examples) and activating image capture hardware 12 to capture the image. The processing circuitry of drone 4 or computing system 8 may execute one or more of the trained models of this disclosure using the image of FIG. 10A to detect the presence of non-flush junction 45. In this way; the trained models of this disclosure may, in its execution phase, provide a model output that indicates the presence of non-flush junction 45, enabling remediation of the resulting board disjointedness in a timely way. In various examples, the model output of the trained models of this disclosure may enable various types of remediation, such as manual repair, automated remediation (e.g., using drones or other equipment), or any other suitable remediation scheme or mechanism.

For example, the board disjointedness caused by non-flush junction 45 may be remediated, based on the model output provided by the trained model(s) of this disclosure, before further construction-related tasks are performed on top of substrate 16. In this example, a trained model of this disclosure reduces or potentially eliminates the need for additional dismantling or deconstruction purely to access non-flush junction 45 before remediation. Instead, by detecting the board disjointedness caused by non-flush junction 45 during envelope layer inspection, the trained model of this disclosure enables remediation of the board disjointedness in a timely and efficient manner.

The image shown in FIG. 10B illustrates defects in the effectiveness of tape 14 when applied over the board disjointedness defect of substrate 16 shown by way of non-flush junction 45 in FIG. 10A. In examples in which the trained model of this disclosure is executed using the image of FIG. 10B, the model output enables various types of remediation, such as a sequence of removal of tape 14, remediation of the board disjointedness stemming from non-flush junction 45, and a reapplication of a new segment of tape 14 to the remediated substrate 16. In some examples, such as examples in which the model is also trained to detect defects in the application of tape 14 to substrate 16 (as described above with respect to FIGS. 1-7), the trained model may also communicate a model output indicating the non-adhesion of tape 14 at non-flush junction 45.

Figure 11:
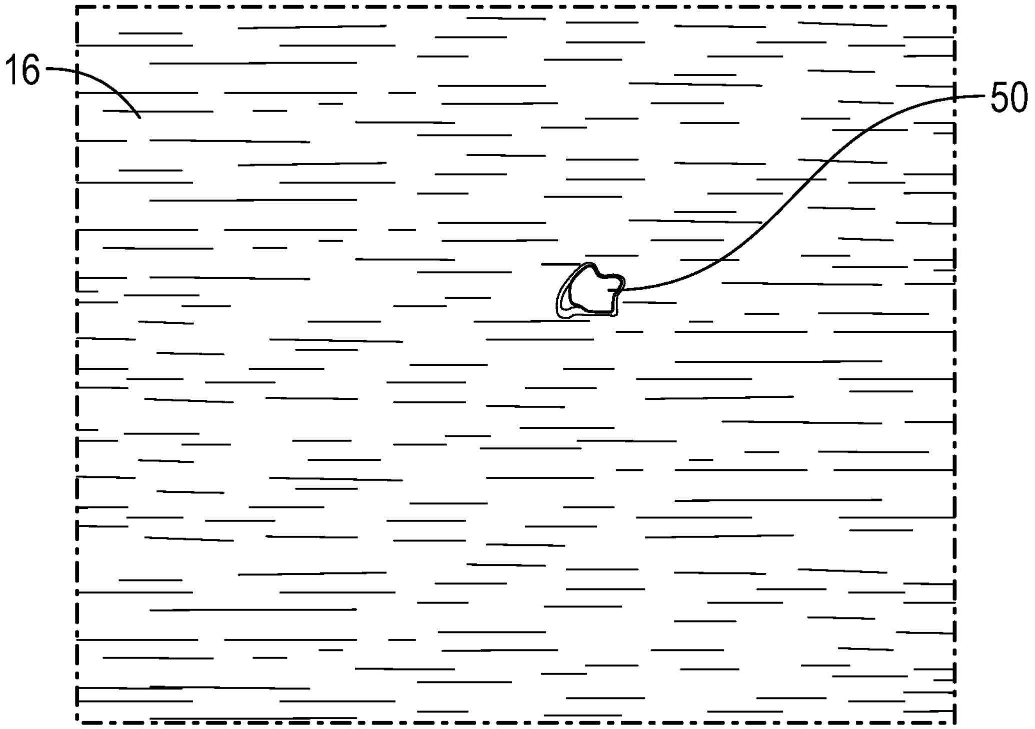
FIG. 11 is a conceptual diagram illustrating an example of a defect in a substrate, which is caused by an overdriven fastener, and detected using the trained classification models of this disclosure.

FIG. 11 is a conceptual diagram illustrating an example of a defect in substrate 16, which is caused by an overdriven fastener, and detected using the trained models of this disclosure. As used herein, the term "overdriven fastener" refers to a nail, screw, tack, bolt, or other fastener that is driven to an excessive depth such that the head or other type of proximal end of the fastener has penetrated substrate 16 and is currently positioned below the substrate. The overdriving of the fastener causes hole 50 to form in the surface (and to some depth below the surface) of substrate 16. Hole 50 represents a defect that may compromise the structural integrity of substrate 16, as well as the integrity of substrate 16 with respect to shielding the interior of building 2 from weather conditions such as temperature, water, and other elements. Hole 50 may cause heat transfer, water ingress, or other diminishment of function with respect to substrate 16. While hole 50 is described herein as being caused by an overdriven fastener as an example, hole 50 may also be caused by other factors, such as windborne debris, a removed fastener, etc.

The processing circuitry of drone 4 or computing system 8 may execute a trained model of this disclosure using the image of FIG. 11 to detect the presence of hole 50. In this way, the trained model(s) of this disclosure may; in the respective execution phase(s), provide a model output that indicates the presence of hole 50, enabling remediation of the resulting board disjointedness in a timely way. The trained model(s) of this disclosure may also provide a documentation trail for construction site administrators, inspectors, contractors, etc., thereby aiding in construction management, for providing information related to insurance, and potentially for clarifying disputed items in future disputes. In this example, the trained model of this disclosure reduces or potentially eliminates the need for additional dismantling or deconstruction purely to access hole 50 before remediation. Instead, by detecting the structural defect in substrate 16 represented by hole 50 during envelope layer inspection, the trained model of this disclosure enables remediation of hole 50 in a timely and efficient manner.

Figure 12A:
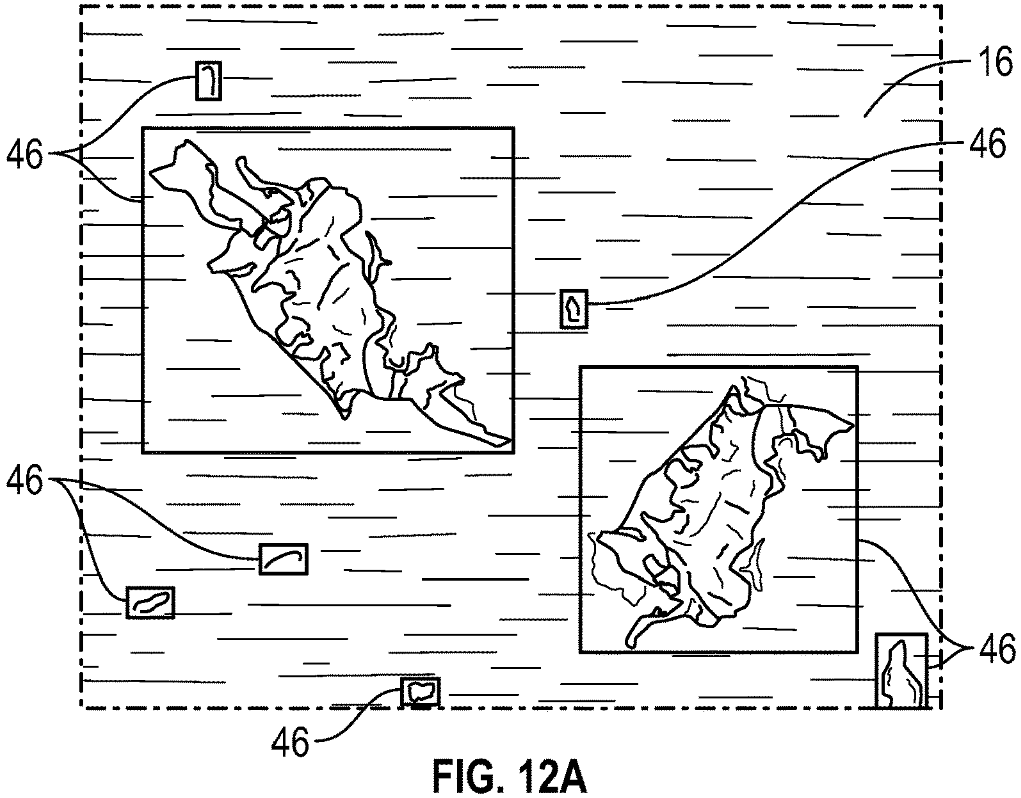
FIGS. 12A and 12B are conceptual diagrams illustrating examples of impact-related damage in a substrate that the trained classification models of this disclosure may detect as a substrate defect.
Figure 12B:
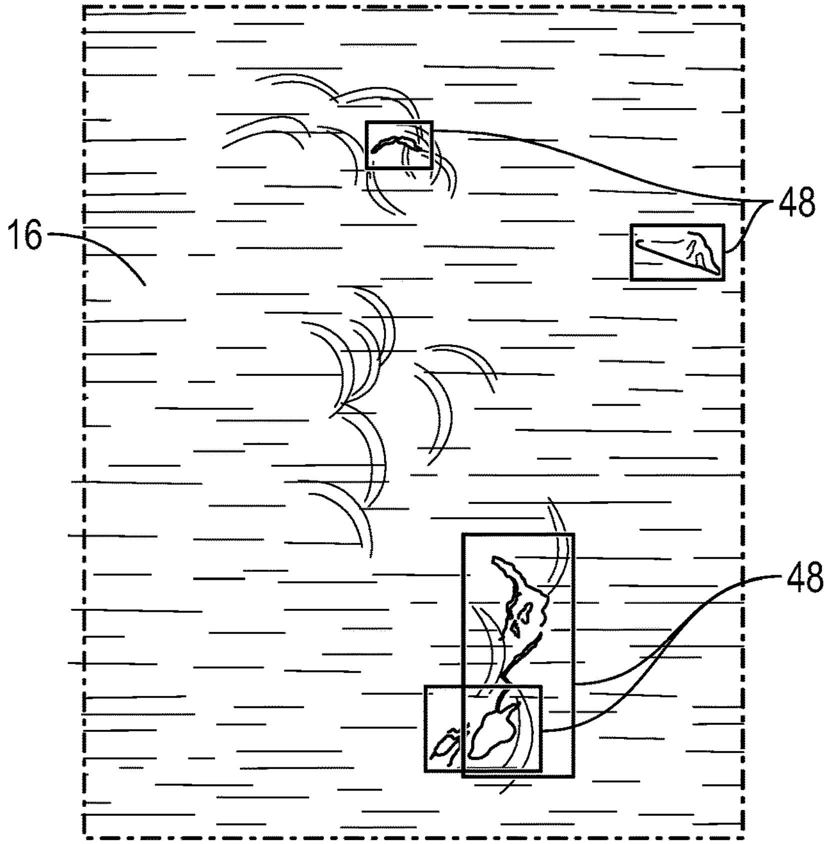

FIGS. 12A and 12B are conceptual diagrams illustrating examples of impact-related damage in substrate 16 that the trained models of this disclosure may detect as a substrate defect. As used herein, the term "impact-related damage" refers to any type of damage to substrate 16 that might result from striking (inward pressure) or gouging (outward pressure). While substrate 16 may exhibit impact-related damage due to a number of different causes, the examples of FIGS. 12A and 12B are described herein with respect to damage caused by hammer claw-end gouging and hammer strikes as non-limiting examples. The impact-related damage illustrated in FIGS. 12A and 12B compromise the structural integrity of building envelopes or other structures represented by substrate 16.

Aspects of system 10 may capture the image of substrate 16 shown in FIG. 12A based on positioning of image capture hardware 12 within sufficient proximity to substrate 16 (e.g., by using drone 4 as shown in FIG. 8 or via manual positioning as discussed above with respect to other examples) and activating image capture hardware 12 to capture the image. The processing circuitry of drone 4 or computing system 8 may execute the trained model of this disclosure using the image of FIG. 12A to detect the presence of surface tears 46. The trained model of this disclosure may; in its execution phase, detect tears of various breadths and severity. As shown in FIG. 12A, the trained model of this disclosure detects two relatively large tears, as well as a number of smaller tears or "dings" in substrate 16. In this way, the trained model of this disclosure may; in its execution phase, provide a model output that indicates the presence of surface tears 46, enabling remediation of surface tears 46 in a timely way.

For example, the board disjointedness caused by non-flush junction 45 may be remediated, based on the model output provided by the trained model of this disclosure, before further construction-related tasks are performed on top of substrate 16. In this example, the trained model of this disclosure reduces or potentially eliminates the need for additional dismantling or deconstruction purely to access non-flush junction 45 before remediation. Instead, by detecting the board disjointedness caused by non-flush junction 45 during envelope layer inspection, the trained model of this disclosure enables remediation of the board disjointedness in a timely and efficient manner.

The image shown in FIG. 12B illustrates surface indentations 48 in substrate 16. Surface indentations 48 may be caused by excessive force and/or improper angling applied when striking the surface of substrate 16 with a hammer, or due to other factors. In examples in which the trained models of this disclosure are executed using the image of FIG. 12B, the respective model output identifies surface indentations 48, which show instances of hammer strikes that exposed material (e.g. wood) positioned underneath a weather-proof coating applied to substrate 16.

Figure 13A:
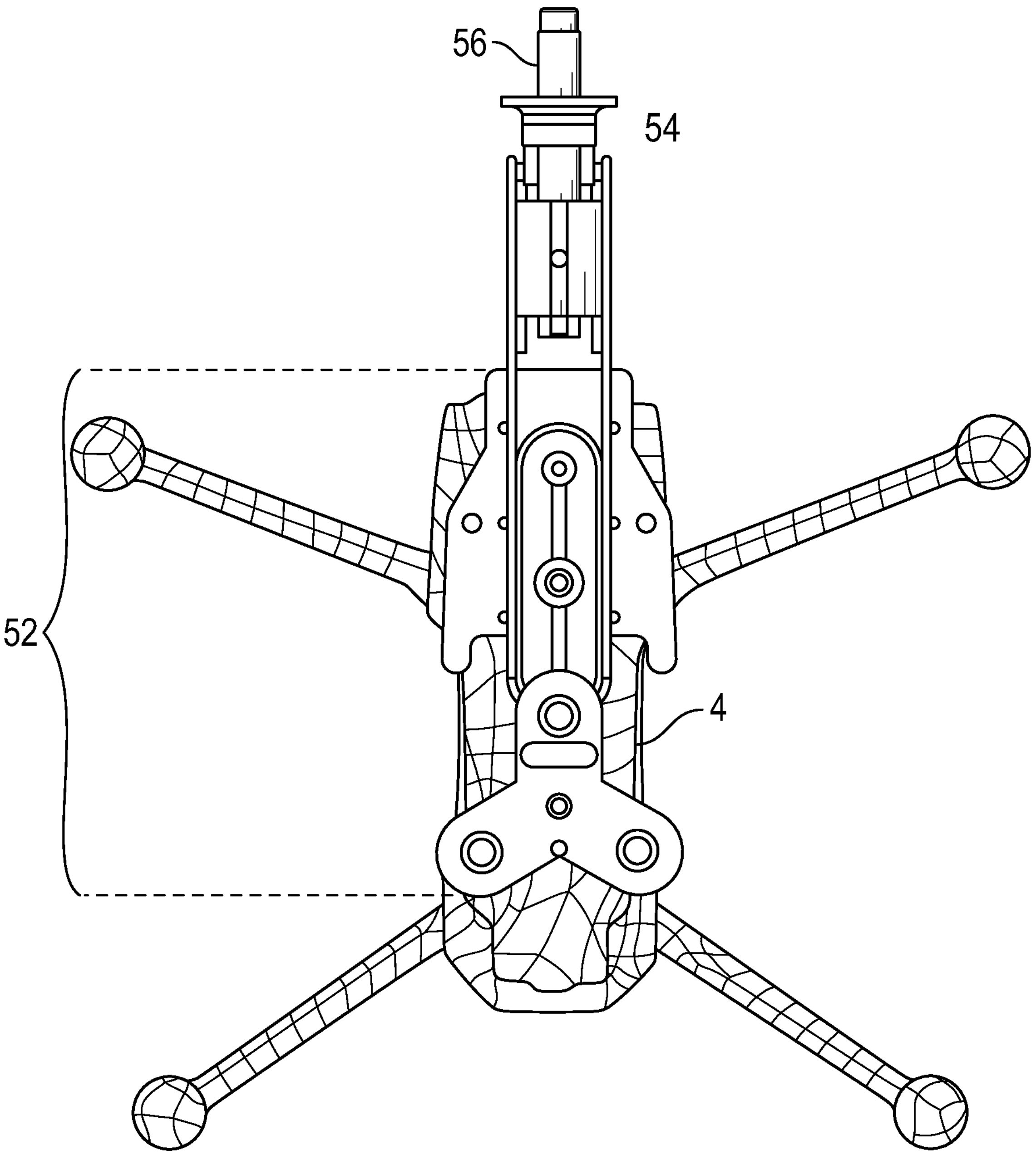
FIGS. 13A and 13B illustrate examples in which a drone is equipped and configured to mark objects of potential survey interest on a substrate or tape, in accordance with aspects of this disclosure.
Figure 13B:
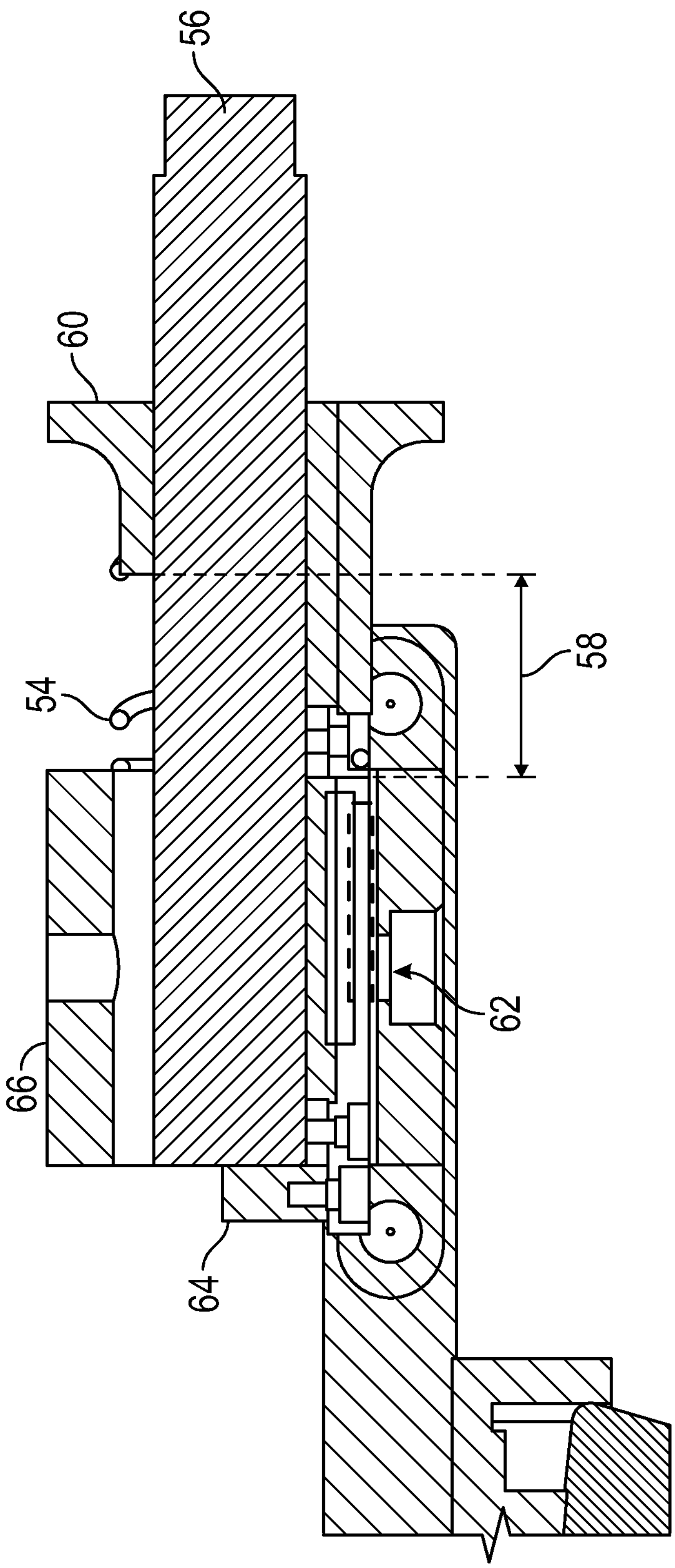

FIGS. 13A and 13B illustrate examples in which drone 4 is equipped and configured to mark objects of potential survey interest (OoPSIs) on substrate 16 or tape 14, in accordance with aspects of this disclosure. In some examples, aspects of system 10 may navigate drone 4 to areas near OoPSIs that are identified using the trained models described above with respect to FIGS. 1-12B, or that are identified in other ways. In the example of FIG. 13A, drone 4 is equipped with a top mount 52. Top mount 52 may represent any hardware or combination of hardware components that, when physically coupled to an upper surface of (in-flight oriented) drone 4, enables further coupling of drone 4 to additional attachments and components. In other embodiments, drone 4 may be equipped with a bottom mount that enables coupling of additional attachments and/or components via a ground-facing surface of drone 4 when in-flight.

Drone 4 is equipped with shock absorption sub-assembly 54. In the example of FIG. 13A, top mount 52 couples drone 4 to shock absorption sub-assembly 54. In some examples, shock absorption sub-assembly 54 represents a compression spring set, which may include a single compression spring, or multiple compression springs. In other examples, shock absorption sub-assembly 54 may represent other types of shock-absorption technology; such as a hydraulic device, a compression bladder, struts, magnetorheological fluid, etc. In any event, shock absorption sub-assembly 54 is configured to absorb and/or damp shock impulses by converting impact-related shock into another form of energy that can be dissipated, such as heat energy.

Drone 4 is also equipped with marking device 56. Marking device 56 may represent various types of equipment configured to mark areas of substrate 16, or areas of tape 14 as applied to substrate 16. In one example, marking device 54 represents an ink-dispensing system, such as a pen, felt pen, marker, bingo dauber, etc. that is configured to dispense ink upon contact between a distal tip of marking device 56 and a receptacle, such as substrate 16 or tape 14 as applied to substrate 16. In another example, marking device 56 is configured to dispense a self-adhesive paper strips onto a receptacle (e.g., substrate 16 or tape 14 as applied to substrate 16) with which the distal tip of marking device 56 comes into contact. In other examples, marking device 56 is configured to mark a receptacle (such as substrate 16 or tape 14 as applied to substrate 16) in other ways.

FIG. 13B shows further details of certain aspects of drone 4 as configured in the example of FIG. 143. FIG. 13B is a side view of various components that are coupled to drone 4 via top mount 52. FIG. 13B shows compression range 58 of shock absorption sub-assembly 54. Compression range 58 represents a length to which shock absorption sub-assembly 54 enables temporary reduction of the overall length of the combination of components that are coupled to drone 4 via top mount 52.

It will be appreciated that compression range 58 does not represent the length to which shock absorption sub-assembly 54 compresses at every instance of marking device 56 impacting a body, such as substrate 16. Rather, compression range 58 represents the maximum compression afforded by shock absorption sub-assembly 54 upon a distal tip of marking device 56 making contact with a rigid or semi-rigid body (e.g., substrate 16 or tape 14 as applied to substrate 16). In the example of the orientation shown in FIG. 13B, the right-side end of marking device 56 includes the distal tip that that comes into contact with substrate 16 as part of the OoPSI marking functionalities described herein.

Depending on the force of the impact, shock absorption sub-assembly 54 may compress to either the full magnitude of compression range 58, or to a magnitude that is less than compression range 58. In the configuration shown in FIG. 13B, shock absorption sub-assembly 54 is positioned between marking mount 60 and rear stop 64. Marking mount 60 represents a component configured to receive marking device 56. In some examples, marking mount 60 has an expandable or configurable diameter and/or shape, thereby enabling marking mount 60 to receive marking devices or other peripherals of varying shapes, sizes, form factors, etc.

In this way, marking mount 60 enables the use of various types of marking peripherals in accordance with the systems and techniques of this disclosure. Rear stop 64 represents a rigid component with a fixed position. Rear stop 64 enables drone 4 to provide a counterforce to the impact of the distal tip marking device 56 with substrate 16 or tape 14, while accommodating the compression provided by shock absorption sub-assembly 54 up to a maximum length represented by the full length of compression range 58.

According to the configuration shown in FIG. 13B, drone 4 is also equipped with motion guide 66. In various examples, motion guide 66 is a linear motion guide that provides a sliding framework for reciprocating movement of marking mount 60 (which holds marking device 56) in response to the distal tip of marking device 56 impacting substrate 16. Motion guide 66 is coupled to drone 4 via top mount 52 and holds shock absorption sub-assembly 54 in place between motion guide 66 and marking mount 60 using one or more fasteners (e.g. in a slotted channel or another type of channel).

Control circuitry of drone 4 is configured to navigate drone 4 to an area associated with (e.g., at, including, or proximate to) an identified OoPSI. The control circuitry may use a local position tracker and other hardware of drone 4 to effectuate these movements of drone 4. For example, the control circuitry may navigate drone 4 to the area associated with the identified OoPSI based on instructions received from control logic of drone 4. The control logic of drone 4 may, in turn, navigate drone 4 to the area associated with the OoPSI based on navigation instructions that the control logic receives from the processing circuitry of drone 4 or computing system 8.

In some examples, drone 4, as configured in the examples of FIGS. 13A & 13B, may navigate to and mark OoPSIs that are associated with defects in substrate 16, such as the examples shown in and described with respect to FIGS. 8, 9A, 10A, and 11-12B. Examples of substrate defect OoPSIs that drone 4 may navigate to and mark in accordance with aspects of FIGS. 13A & 13B include surface tears, underdriven fasteners, overdriven fasteners, surface gouging, excess sealant, board disjointedness, gaps, etc.

In some examples, drone 4, as configured in the examples of FIGS. 13A & 13B, may navigate to and mark OoPSIs that are associated with tape misapplication(s) with respect to tape 14 as applied to substrate 16, such as the examples shown in and described with respect to FIGS. 2-7, 9B, and 10B. Examples of tape misapplication-related OoPSIs that drone 4 may navigate to and mark in accordance with aspects of FIGS. 13A & 13B include fishmouth creasing, tenting of tape 14 as applied to substrate 16, missing segment(s), various types of insufficient adhesion, insufficient tension, etc.

Figure 14A:
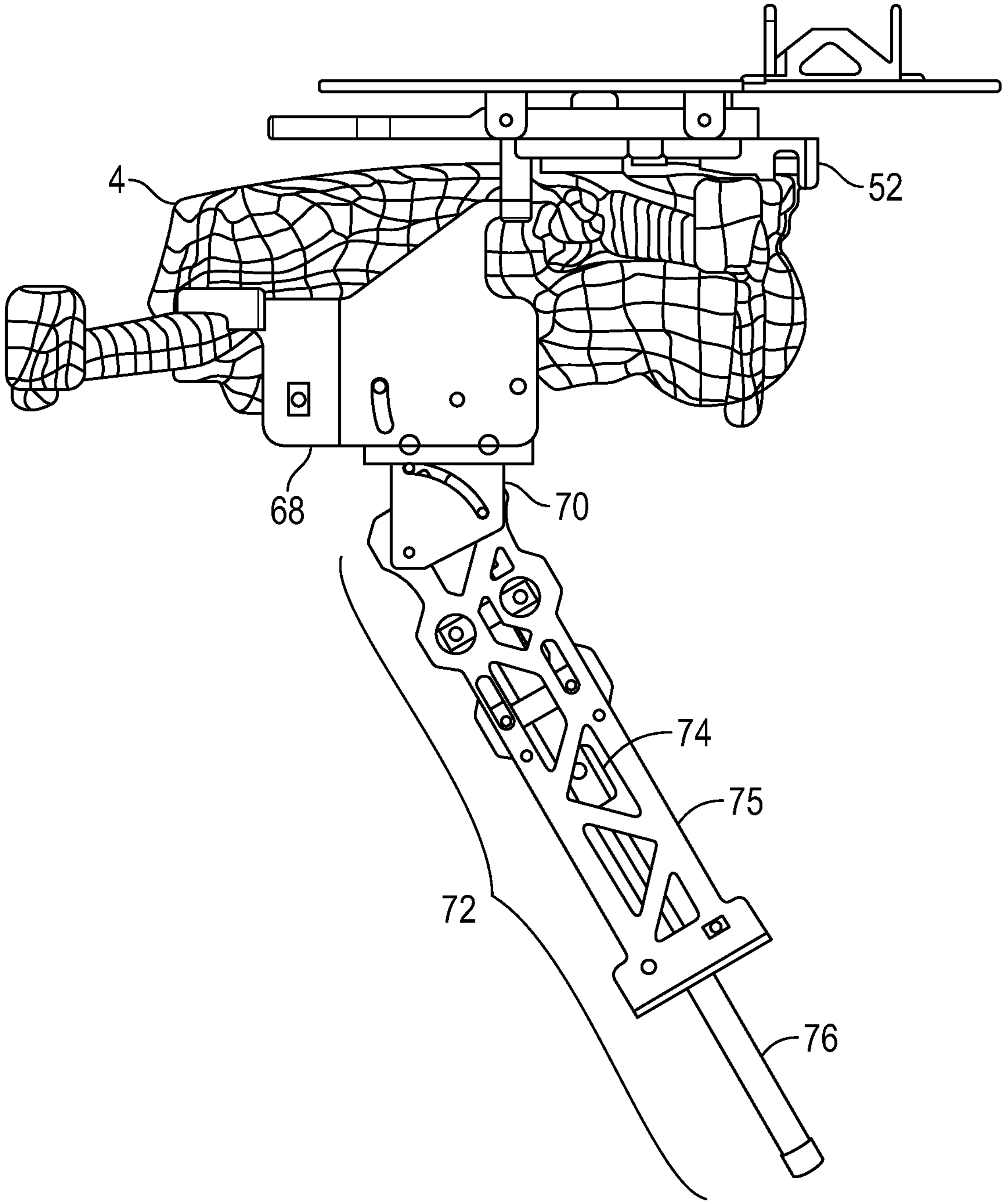
FIGS. 14A-14C are conceptual diagrams illustrating examples in which a drone is equipped and configured to remediate objects of potential survey interest on a substrate or tape as applied to the substrate, in accordance with aspects of this disclosure.
Figure 14B:
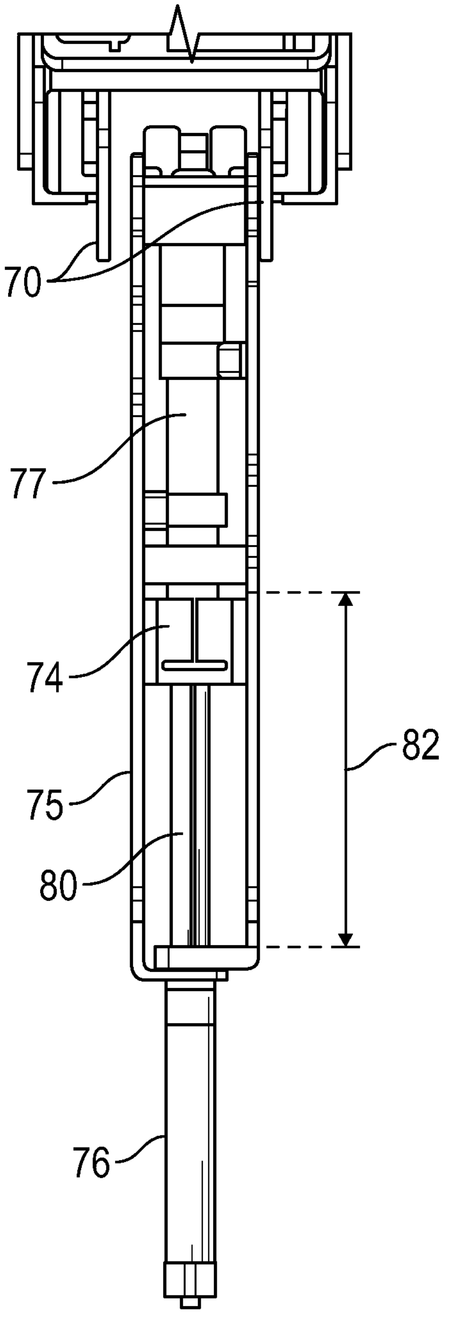
Figure 14C:
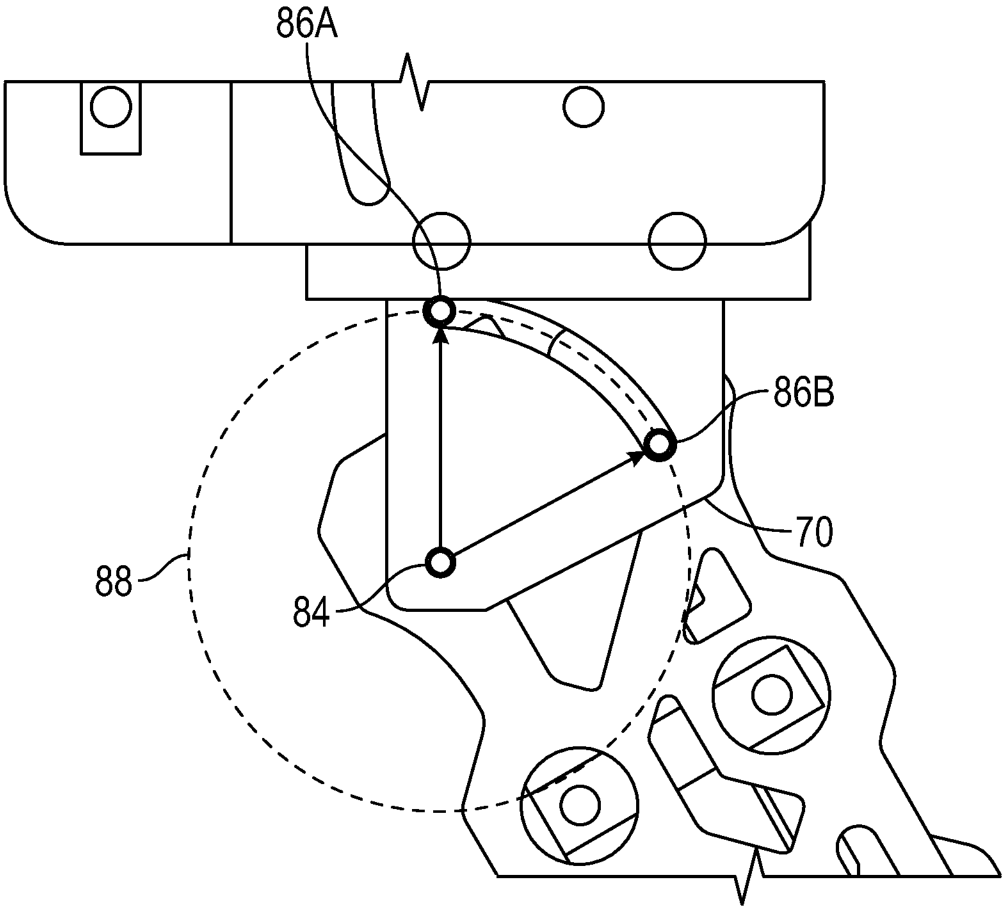

FIGS. 14A-14C are conceptual diagrams illustrating examples in which drone 4 is equipped and configured to remediate OoPSIs on substrate 16 or tape 14 as applied to substrate 16, in accordance with aspects of this disclosure. In some examples, aspects of system 10 may navigate drone 4 to areas near OoPSIs that are identified using the trained models described above with respect to FIGS. 1-12B, or that are identified in other ways. In the example of FIG. 14A, drone 4 is equipped with top mount 52 and a lower mount 68. Lower mount 68 may represent any hardware or combination of hardware components that, when physically coupled to a lower surface or ground-facing surface of (in-flight oriented) drone 4, enables further coupling of drone 4 to additional attachments and components.

By way of lower mount 68, drone 4 is equipped with dispenser sub-assembly 72. Dispenser sub-assembly 72 includes a housing 75 that receives syringe 76. As shown, housing 75 is configured to receive syringe 76 in a position and orientation such that an applicator of syringe 76 is positioned distally from housing 75. As such, dispenser sub-assembly 72 is configured to house syringe 76 in a position and orientation that enables extrusion of any contents of syringe 76 in a distal direction from an airframe of drone 4.

As described with respect to FIG. 13B, control circuitry of drone 4 is configured to navigate drone 4 to an area associated with (e.g., at, including, or proximate to) an identified OoPSI based on instructions that control logic of drone 4 generates based on navigation instructions received from the processing circuitry of drone 4 or computing system 8. The control logic of drone 4 may also receive extruding instructions from the processing circuitry of drone 4 or computing system 8.

FIG. 14B shows a top view of dispenser sub-assembly 72. Based on the extruding instructions received from the processing circuitry; the control logic may activate actuator motor 77. For instance, based on the received extruding instructions, the control logic of drone 4 may cause actuator motor 77 to move actuator arm 80 in an extension phase of a reciprocating motion. The extension phase of the reciprocating motion represents a phase in which actuator arm 80 moves on a linear path distally from the airframe of drone 4. An appointed distance 82 signifies the a distance the actuator can move within the dispenser sub-assembly 72, which may correlate to the depletion of material in this form factor.

By moving actuator arm 80 in the extension phase of the reciprocating motion, actuator motor 77 causes actuator arm 80 to extrude a portion of the contents of syringe 76. Based on drone 4 being positioned at an area associated with an identified OoPSI, actuator motor 77 causes actuator arm 80 to extrude the contents of syringe 76 at the area associated with the OoPSI. In some examples, based on the navigation instructions and/or the extruding instructions, the control logic of drone 4 is configured to move drone 4 in parallel, or substantially in parallel, with the surface of substrate 16 while actuator arm 80 is in the extension phase of the reciprocating motion to extrude the contents of syringe 76.

As used herein, movement of drone 4 substantially in parallel with the surface of substrate 16 refers to movement in any pattern that is substantially parallel to the X-Y plane of substrate 16. By moving drone 4 substantially in parallel with the X-Y plane of substrate 16 while actuator arm 80 is in the extension phase, the control logic of drone 4 processes the navigation instructions and the extruding instructions to extrude the contents of syringe 76 over some, most, or all of the identified OoPSI.

That is, the navigation instructions may correspond to a movement pattern that, upon completion, covers some, most, or all of the identified OoPSI. In some examples, based on an extrusion increment associated with the extruding instructions, the control logic of drone 4 may cause actuator motor 77 to move actuator arm 80 in a retraction phase of the reciprocating motion to cease extruding the contents of syringe 76. That is, the extrusion increment may define an amount of the contents of syringe 76 to be extruded in order to rectify the OoPSI, assuming movement of drone 4 to cover a sufficient area of the OoPSI while the contents of syringe 76 are being extruded.

Actuator coupler 74 physically couples the distal end of actuator arm 80 (with respect to the airframe of drone 4) to the proximal end of syringe 76 (with respect to the airframe of drone 4), causing the proximal end of syringe 76 to track both extension and retraction phases of the reciprocating motion of actuator arm 80.

FIG. 14C shows further details of slotted channel 70 shown in FIG. 14A. As shown in FIG. 14A, slotted channel 70 is configured to couple dispenser sub-assembly 72 to the airframe of drone 4. Slotted channel 70 provides a self-weighted uncontrolled degree of freedom (DOF) 88 for radial movement of dispenser sub-assembly 72 with respect to the reference point of the point of fixture to the airframe of drone 4. By providing uncontrolled DOF 88 for the movement of dispenser sub-assembly 72, slotted channel 70 provides an error buffer (e.g., against wind gusts, rotor wash, etc.) with respect to the radial movement of dispenser sub-assembly 72.

Uncontrolled DOF 88 provided by slotted channel 70 reduces the need for additional motors and onboard component infrastructure that would be required in the case of controlled DOF implementations, which in turn would add weight to a potentially weight-sensitive system. However, it will be appreciated that controlled-DOF implementations and/or rigidly affixed implementations are also consistent with the adhesive-dispensing drone implementations of this disclosure. FIG. 14C shows pivot hub 84 and radial fasteners 86A & 86B. Radial fasteners 86A & 86B are positioned equidistantly from pivot hub 84, providing an arc included in uncontrolled DOF 88.

While only an arc represented by the circumferential movement between radial fasteners 86A & 86B is shown in FIG. 14C purely for ease of illustration, it will be appreciated that slotted channel 70 may include varying numbers of radial fasteners to provide uncontrolled DOF 88. In various examples, syringe 76 may be loaded with various types of adhesive content, such as caulk, general purpose silicone adhesives, nitrocellulose adhesives, paste sealant, epoxy acrylic, or other adhesive suitable to be dispensed using dispenser sub-assembly 72. In some examples, drone 4 may be equipped with swappable syringes, with syringe 76 representing a currently in-use syringe, with other backup and/or used-up syringes also on board.

The embodiments of drone 4 shown in FIGS. 14A-14C may dispense the adhesive contents of syringe 76 to remediate various types of OoPSIs, including, but not limited to, defects in substrate 16 such as surface tears, underdriven fasteners, overdriven fasteners, surface gouging, gaps or other discontinuities between boards, impact-related damage, etc. and/or misapplications of tape 14 such as fishmouth creasing, tears or scrapes, creasing, tenting, missing tape segments, an insufficient adhesion, insufficient tension, etc.

Figure 15:
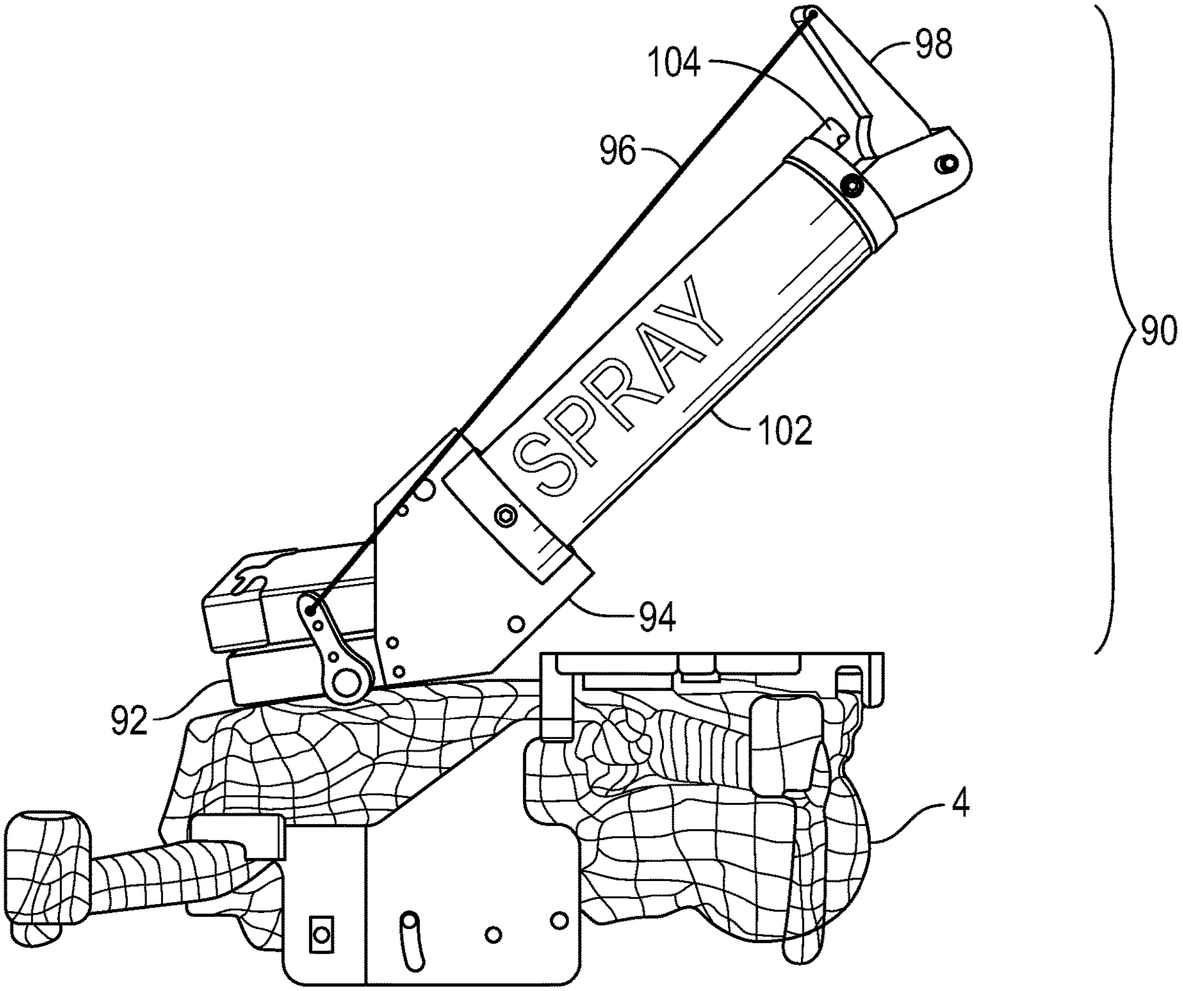
FIG. 15 is a conceptual diagram illustrating another example in which a drone is equipped and configured to remediate objects of potential survey interest on a substrate or tape as applied to the substrate, in accordance with aspects of this disclosure.

FIG. 15 is a conceptual diagram illustrating another example in which drone 4 is equipped and configured to remediate OoPSIs on substrate 16 or tape 14 as applied to substrate 16, in accordance with aspects of this disclosure. In some examples, aspects of system 10 may navigate drone 4 to areas near OoPSIs that are identified using the trained models described above with respect to FIGS. 1-12B, or that are identified in other ways. In the example of FIG. 15, drone 4 is equipped with dispenser sub-assembly 90. Dispenser sub-assembly 90 includes a housing 94 that receives aerosol dispensing system 102. While dispenser sub-assembly 90 is shown in FIG. 15 as being mounted on the top surface of drone 4 as a non-limiting example, it will be appreciated that, in another examples in accordance with this disclosure, dispenser sub-assembly 90 may be coupled to drone 4 in other ways.

Aerosol dispensing system 102 may represent one or more types of cans or storage devices configured to release compressed contents upon open of a pressure valve, such as by depressing nozzle 104. As described with respect to FIG. 13B, control circuitry of drone 4 is configured to navigate drone 4 to an area associated with (e.g., at, including, or proximate to) an identified OoPSI based on instructions that control logic of drone 4 generates based on navigation instructions received from the processing circuitry of drone 4 or computing system 8. The control logic of drone 4 may also receive dispensing instructions from the processing circuitry of drone 4 or computing system 8.

Based on the dispensing instructions received from the processing circuitry, the control logic may activate motor 92. For instance, based on the received dispensing instructions, the control logic of drone 4 may cause motor 92 to move trigger 98 in a retracting phase of a reciprocating motion. The retraction phase of the reciprocating motion represents a phase in which trigger 98 moves proximally towards the airframe of drone 4. For example, when activated in this way by the control logic of drone 4, motor 92 may retract link wire 96 towards the airframe of drone 4, thereby retracting trigger 98, which is coupled to link wire 96.

By moving trigger 98 in the retraction phase of the reciprocating motion, motor 92 causes trigger 98 to depress nozzle 104, thereby releasing a portion of the contents of aerosol dispensing system 102. Based on drone 4 being positioned at an area associated with an identified OoPSI, motor 92 causes trigger 98 to depress nozzle 104 and dispense the contents of aerosol dispensing system 102 at the area associated with the OoPSI. In some examples, based on the navigation instructions and/or the dispensing instructions, the control logic of drone 4 is configured to move drone 4 in parallel, or substantially in parallel, with the surface of substrate 16 while trigger 98 is in the retraction phase of the reciprocating motion to keep nozzle 98 depressed and to thereby dispense the contents of aerosol dispensing system 102.

As used herein, movement of drone 4 substantially in parallel with the surface of substrate 16 refers to movement in any pattern that is substantially parallel to the X-Y plane of substrate 16. By moving drone 4 substantially in parallel with the X-Y plane of substrate 16 while trigger 98 is in the retraction phase of the reciprocating motion, the control logic of drone 4 processes the navigation instructions and the extruding instructions to dispense the contents of aerosol dispensing system 102 over some, most, or all of the identified OoPSI.

That is, the navigation instructions may correspond to a movement pattern that, upon completion, covers some, most, or all of the identified OoPSI. In some examples, based on a dispensing increment associated with the extruding instructions, the control logic of drone 4 may cause motor 92 to release at least part of the tension applied to link wire 96 to move trigger 98 in an extension phase of the reciprocating motion to cease dispensing the contents of aerosol dispensing system. That is, the dispensing increment may define an amount of the contents of aerosol dispensing system 102 to be sprayed in order to rectify the OoPSI, assuming movement of drone 4 to cover a sufficient area of the OoPSI while the contents of aerosol dispensing system 102 are being sprayed.

The contents of aerosol dispensing system 102 may include any aerosol-propelled sealant or any other material suitable to be sprayed over an identified OoPSI for sealing or molding purposes, such as a rubber sealant, a weatherproof spray paint, pressurized foam sealant, etc. The embodiment of drone 4 shown in FIG. 15 may dispense the contents of aerosol dispensing system 102 to remediate various types of OoPSIs, including, but not limited to, defects in substrate 16 such as surface tears, overdriven fasteners, surface gouging, gaps or other discontinuities between boards, impact-related damage, etc. and/or misapplications of tape 14 such as tears or scrapes, missing tape segments, an insufficient adhesion, etc.

In some implementations consistent with FIGS. 14A-15, drone 4 may be equipped with a light source, a light sensor, and an optical fiber link coupling the light source to the light sensor. In these implementations, the control logic of drone 4 may activate the light source based on the dispensing/extruding instructions, and motor 92 or actuator motor 77 (as the case may be) is configured to move trigger 98 in the retraction phase or actuator arm 80 in the extension phase of the respective reciprocating motion. In these examples, the control logic of drone 4 uses these light-based techniques to depress nozzle 104 or to extrude the contents of syringe 76 to dispense the contents of aerosol dispensing system or syringe 76 at the area associated with the OoPSI in response to the light sensor detecting the activation of the light source via the optical fiber link.

In other implementations consistent with FIGS. 14A-15, drone 4 may be equipped with a microcontroller, a Bluetooth R or other near-field, low power, wireless transceiver, and a power source, such as a battery or battery pack. The microcontroller may continuously run a script, which, at appropriate function calls, may initiate a connection with the wireless transceiver, and send signals corresponding to the dispensing increment or extrusion increment. In these examples, the microcontroller-transceiver based subsystem is separate and independent from the firmware of drone 4, and is therefore portable between and agnostic to different underlying UAV platforms, pending certain mechanical adjustments to suit the underlying UAV platform.

Figure 16:
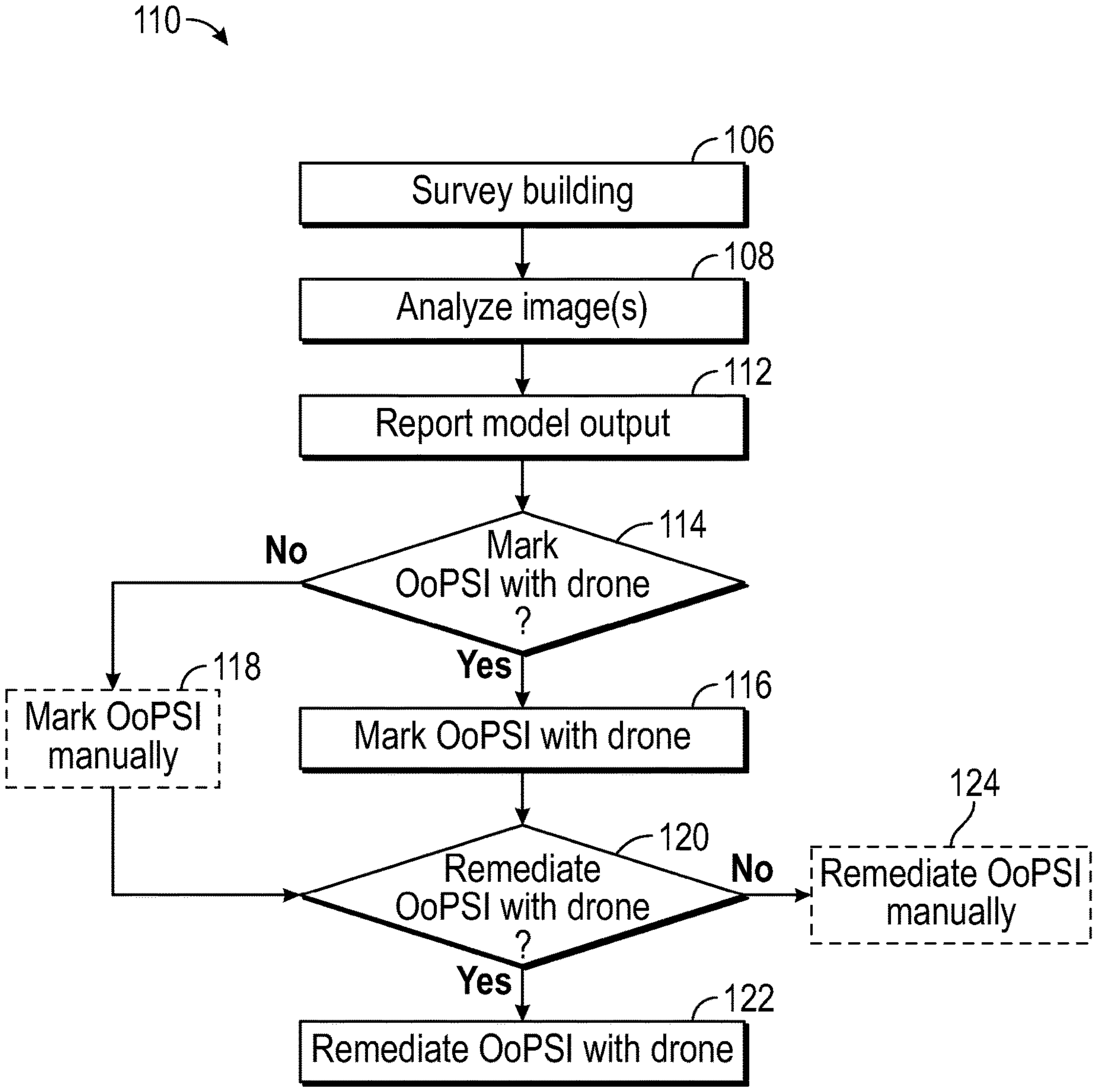
FIG. 16 is a flowchart illustrating an example process of this disclosure.

FIG. 16 is a flowchart illustrating an example process 110 of this disclosure. Process 110 may begin with a survey of building 2 (106). For instance, control logic of drone 4 may navigate drone 4 and activate image capture hardware 12 to capture one or more images of building 2. In turn, processing circuitry of drone 4 or computing system 8 may analyze the one or more images (108). In various examples, the processing circuitry of drone 4 or computing system 8 may analyze the image(s) received from image capture hardware by executing one or more of a trained classification model, a trained detection model, or a trained segmentation model of this disclosure to generate a model output.

The processing circuitry may report the model output (112). For instance, the processing circuitry may be communicatively coupled to output hardware communicatively coupled to the processing circuitry. In these examples, the processing circuitry may be configured to output model output via the output hardware, which may be a monitor, a speaker, a communications interface configured to relay the model input to another device, etc. As described above with respect to FIGS. 4A-4D and FIGS. 6A-6D, the model output may be indicative of defective condition and/or of specific OoPSI(s) shown in the image(s).

Process 110 includes a determination of whether or not to mark a detected OoPSI using drone 4 (decision block 114). If the determination is to mark the detected OoPSI using drone 4 ('YES' branch of decision block 114), control logic of drone 4 may cause drone 4 to mark the OoPSI (116), such as by using techniques described above with respect to 13A & 13B. If the determination is to not mark the detected OoPSI using drone 4 ('NO' branch of decision block 114), then site administrators may optionally mark the detected OoPSI manually (118). The optional nature of manual marking of a detected OoPSI is shown by way of the dashed-lined border of step 118 in FIG. 16.

Process 110 also includes a determination of whether or not to remediate a detected OoPSI using drone 4 (decision block 120). If the determination is to remediate the detected OoPSI using drone 4 ('YES' branch of decision block 120), control logic of drone 4 may cause drone 4 to remediate the OoPSI (122), such as by using techniques described above with respect to 14A-15. If the determination is to not remediate the detected OoPSI using drone 4 ('NO' branch of decision block 120), then site administrators may optionally remediate the detected OoPSI manually (124). The optional nature of manual remediation of a detected OoPSI is shown by way of the dashed-lined border of step 124 in FIG. 16. In various examples, the control logic of drone 4 may be configured to navigate drone 4 to the area surrounding the OoPSI and effectuate the remediation measure in response to the processing circuitry detecting a mark placed manually or by drone 4 by analyzing image(s) received from image capture hardware 12.

In some implementations, a software application executing on computing system 8 (which in these implementations is communicatively coupled to controller 6) autonomously identifies one or more targets on substrate 16 to be remediated via spraying by aerosol dispensing system 90. The application may process video data of a video feed received from drone 4 (e.g., via image capture hardware 12 or other video capture hardware with which drone 4 may be equipped). For example, the application may identify a crack between two plywood boards, cause the control logic of drone 4 to align drone 4 with an edge or end of the crack, to activate aerosol dispenser system 102 to begin spraying, and to move drone 4 along the crack until drone 4 reaches the opposite end of the crack, at which point the control logic may deactivate aerosol dispensing system 90, causing the spraying to stop.

In another example, the application may identify a gap that circumscribes the junction of a pipe with substrate 16, cause the control logic of drone 4 to align drone 4 with the edge of the crack, to activate aerosol dispenser system 102 to begin spraying, and to move drone 4 along a circular path that tracks the junction of the pipe with substrate 16 until drone 4 fully circumnavigates the junction, at which point the control logic may deactivate aerosol dispensing system 90, causing the spraying to stop. In either of these examples, the application may identify the crack, the pipe, or the pipe junction by executing a computer vision-oriented machine learning model trained using a dataset of numerous images of substrate 16 at different distances, angles, lighting conditions, etc. While described as "circular" it will be appreciated that the path of drone 4 to remediate a gap at a pipe junction may be oblong, elliptical, or any other type of closed shape.

Computer vision processing may be performed areas within labeled bounding boxes around areas of interest. In one example of a computer vision processing workflow of this disclosure, the application running on computing system 8 may execute a trained machine learning algorithm to read a video frame received from image capture hardware 12, separate an object of interest from a background of the image (e.g., using color masking or other techniques), may refine the mask (e.g., using morphological operations, such as dilating, eroding, etc.), and may detect one or more edges (e.g., using Canny edge detection).

In this example, the trained machine learning algorithm may erode the mask to remove outer edges, fit lines to edges (e.g., using a Hough line transform), filter out less relevant or irrelevant Hough lines (e.g., using DBSCAN clustering), and may fine intersections of Hough lines with the mask edge(s). In this example, the trained machine learning algorithm may find the most fitting intersection point (e.g., using k-means clustering), calculate the distance from the most fitting interaction point to the video center, and pass variables to control logic of drone 4 over the wireless communicative connection.

The variables may indicate a crack start point, a crack, angle, and other parameters that enable the control logic to navigate drone 4 in a way that enables aerosol dispensing system 90 to remediate the detected crack(s) in a complete way. Although described primarily with respect to the use of aerosol dispensing system 90, it will be appreciated that the computer vision processing aspects of this disclosure also enable OoPSI marking (e.g. using configurations shown in FIGS. 13A-13C and/or to enable OoPSI remediation using adhesive dispensing as shown by way of the examples of FIGS. 14A & 14B.

An example procedure by which aspects of system 10 implements a remediation procedure (whether using dispenser sub-assembly 72 or aerosol dispensing system 90) is described below. In this example, control logic of drone 4 may align drone 4 with the OoPSI that is to be remediated. In turn, the control logic may activate either dispenser sub-assembly 72 or aerosol dispensing system 90 using any mechanism consistent with this this disclosure, such as the light-toggling mechanism described above, the microcontroller-based mechanism described above, etc. aspects of system 10 may execute the computer vision procedure described above.

Based on the output of the computer vision procedure, processing circuitry may determine whether an angle of the OoPSI (e.g., a crack angle) is within a predetermined range. If the crack angle is not within the predetermined range, the control logic may adjust the yaw of drone 4 with reference to substrate 16, and re-execute the computer vision procedure for an evaluation of the OoPSI angle.

If the OoPSI is within the predetermined range (whether on the first iteration or a subsequent iteration of angle evaluation with respect to execution passes of the computer vision procedure), the processing circuitry may determine whether an end of the OoPSI (e.g., a crack end) is centered or substantially centrally located in the video frame or other image captured by image capture hardware 12. If the OoPSI end is not centered or located substantially centrally located in the frame, the control logic may adjust pitch and/or roll of drone 4 so as to move drone 4 along the OoPSI, thereby aligning either dispenser sub-assembly 72 or aerosol dispensing system 90 with the OoPSI end to begin remediation at an appropriate location.

The processing circuitry may iteratively re-execute the computer vision procedure until the OoPSI end is located substantially centrally in a frame recently captured via image capture hardware. Upon an execution cycle of the computer vision procedure that shows the OoPSI angle being within the predetermine range and the OoPSI end being substantially centrally located within a frame captured by image capture hardware 12, the control logic may deactivate dispenser sub-assembly 72 or aerosol dispensing system 90 to remediate the OoPSI (e.g., using any of the light-toggling mechanism described above, the microcontroller-based mechanism described above, or any other activation mechanism consistent with this this disclosure).

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about" or "approximately" or "substantially." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a." "an," and "the" encompass embodiments having plural referents, unless the content clearly dictates otherwise. As used in this specification and the appended claims, the term "or" is generally employed in its sense including "and/or" unless the content clearly dictates otherwise.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, CPUs, GPUs, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system comprising:

image capture hardware configured to capture an image of a tape as applied to a substrate;

a memory communicatively coupled to the image capture hardware, the memory being configured to store the image; and processing circuitry communicatively coupled to the memory, the processing circuitry being configured to:

analyze the image according to a trained model; and based on the analysis of the image according to the trained model, detect a misapplication with respect to the tape as applied to the substrate, the misapplication being associated with at least one of a fishmouth crease, a tenting of the tape as applied to the substrate, a missing tape segment, an insufficient adhesion, or an insufficient tension.

2. The system of claim 1, wherein the trained model is a trained neural network model.

3. The system of claim 1, wherein the image is expressed in an RGB color space or a grayscale space.

4. The system of claim 1, wherein the image capture hardware is integrated into a mobile computing device.

5. The system of claim 4, wherein the mobile computing device comprises one of a smartphone, a tablet computer, or a wearable computing device.

6. The system of claim 1, wherein the image capture hardware is integrated into a drone.

7. The system of claim 6, wherein the processing circuitry comprises one or both of a graphics processing unit (GPU) or a central processing unit (CPU) integrated into the drone.

8. The system of claim 1, further comprising output hardware communicatively coupled to the processing circuitry, wherein the processing circuitry is further configured to output, via the output hardware, a model output indicative of the misapplication of the tape as applied to the substrate.

9. The system of claim 1, wherein the trained model is configured to implement one or more of full-image classification, sub-image classification, object detection, or image segmentation with respect to the image.

10. The system of claim 1, wherein the substrate is an envelope layer of a building.

11. A method comprising:

capturing, by image capture hardware, an image of a tape as applied to a substrate;

analyzing, by processing circuitry communicatively coupled to the image capture hardware, the image according to a trained model; and detecting, by the processing circuitry, a misapplication with respect to the tape as applied to the substrate based on the analysis of the image according to the trained model, the misapplication being associated with at least one of a fishmouth crease, a tenting of the tape as applied to the substrate, a missing tape segment, an insufficient adhesion, or an insufficient tension.

12. The method of claim 11, wherein the trained model is a trained neural network model.

13. The method of claim 11, wherein the image is expressed in an RGB color space or a grayscale space.

14. The method of claim 1, wherein the image capture hardware is integrated into a mobile computing device.

15. The method of claim 1, wherein the image capture hardware is integrated into a drone.

16. The method of claim 1, further comprising outputting, by the processing circuitry, via output hardware communicatively coupled to the processing circuitry, a model output indicative of the misapplication of the tape as applied to the substrate.

17. The method of claim 1, wherein the trained model is configured to implement one or more of full-image classification, sub-image classification, object detection, or image segmentation with respect to the image.

18. A computer-readable storage device encoded with instructions that, when executed, cause processing circuitry of a computing device to:

receive, from image capture hardware, an image of a tape as applied to a substrate;

store the image to the computer-readable storage device;

analyze the image according to a trained model; and based on the analysis of the image according to the trained model, detect a misapplication with respect to the tape as applied to the substrate, the misapplication being associated with at least one of a fishmouth crease, a tenting of the tape as applied to the substrate, a missing tape segment, an insufficient adhesion, or an insufficient tension.

* * * * *